US009618759B2

(12) United States Patent
Morifuji et al.

(10) Patent No.: US 9,618,759 B2
(45) Date of Patent: Apr. 11, 2017

(54) IMAGE DISPLAY APPARATUS AND IMAGE DISPLAY METHOD

(71) Applicant: Sony Corporation, Tokyo (JP)

(72) Inventors: Takafumi Morifuji, Tokyo (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1 day.

(21) Appl. No.: 14/418,533

(22) PCT Filed: Jul. 17, 2013

(86) PCT No.: PCT/JP2013/069387
§ 371 (c)(1),
(2) Date: Jan. 30, 2015

(87) PCT Pub. No.: WO2014/024649
PCT Pub. Date: Feb. 13, 2014

(65) Prior Publication Data
US 2015/0261003 A1 Sep. 17, 2015

(30) Foreign Application Priority Data
Aug. 6, 2012 (JP) ................... 2012-173556

(51) Int. Cl.
G09G 5/00 (2006.01)
G02B 27/22 (2006.01)
(Continued)

(52) U.S. Cl.
CPC ..... G02B 27/2264 (2013.01); G02B 27/0093 (2013.01); G02B 27/0172 (2013.01);
(Continued)

(58) Field of Classification Search
CPC .............. G02B 27/008; G02B 27/0093; G02B 27/0172; G02B 2027/011;
(Continued)

(56) References Cited

U.S. PATENT DOCUMENTS

2011/0122235 A1* 5/2011 Lee .................... H04N 13/0452
348/51
2011/0279355 A1* 11/2011 Yasue .................. G02B 27/017
345/8
2012/0008048 A1* 1/2012 Sekine .................... A63F 13/10
348/566

FOREIGN PATENT DOCUMENTS

JP 05-328408 A 12/1993
JP 10-188034 A 7/1998
(Continued)

Primary Examiner — Mark Regn
(74) Attorney, Agent, or Firm — Chip Law Group

(57) ABSTRACT

A display image is superimposed and displayed on an outside image in a preferred manner.
An optical system superimposes a display image displayed on a display device onto an outside image, and leads the display image to an eye of an observer. A display control unit controls the display size and the display position of the display image on the display device so that the display image is displayed in an image superimposition region (a flat region) detected from the outside image. For example, the display control unit controls the display state of the display image in accordance with the state of the image superimposition region in the outside image. Also, the display control unit performs control to selectively display the display image in a line-of-sight region or outside the line-of-sight region in accordance with the line of sight of the observer.

21 Claims, 15 Drawing Sheets

(51) Int. Cl.
*G02B 27/00* (2006.01)
*G09G 3/00* (2006.01)
*G02B 27/01* (2006.01)
*G06F 3/01* (2006.01)
*G06T 19/00* (2011.01)
*H04N 13/00* (2006.01)
*H04N 13/02* (2006.01)
*H04N 13/04* (2006.01)

(52) U.S. Cl.
CPC ............ *G06F 3/013* (2013.01); *G06T 19/006* (2013.01); *G09G 3/003* (2013.01); *H04N 13/004* (2013.01); *H04N 13/0022* (2013.01); *H04N 13/0033* (2013.01); *H04N 13/0051* (2013.01); *H04N 13/0239* (2013.01); *H04N 13/044* (2013.01); *H04N 13/0484* (2013.01); *H04N 13/0497* (2013.01); *G02B 2027/011* (2013.01); *G02B 2027/0143* (2013.01); *G02B 2027/0187* (2013.01); *H04N 13/0434* (2013.01); *H04N 13/0438* (2013.01)

(58) Field of Classification Search
CPC .... G02B 2027/0143; G02B 2027/0187; G06F 3/013; G06T 19/006; G09G 3/003; H04N 13/0022
USPC .............................................. 345/8
See application file for complete search history.

(56) References Cited

FOREIGN PATENT DOCUMENTS

| | | | |
|---|---|---|---|
| JP | 2006-154890 A | | 6/2006 |
| JP | 2006-267604 A | | 10/2006 |
| JP | 2010-177788 A | | 8/2010 |
| JP | 2010-237522 | * | 10/2010 |
| JP | 2010-237522 A | | 10/2010 |
| JP | 2011-091789 A | | 5/2011 |
| JP | 2012-108379 | * | 6/2012 |
| JP | 2012-108379 A | | 6/2012 |

* cited by examiner

IMAGE DISPLAY APPARATUS AND IMAGE DISPLAY METHOD

TECHNICAL FIELD

The present technique relates to image display apparatuses and image display methods, and more particularly, to an image display apparatus such as an optically-transmissive head mount display designed to superimpose an image displayed on a display device onto an outside image and lead the image to an eye of an observer, and the like.

BACKGROUND ART

Head mount displays (HMDs) that are mounted on the heads of users have become known in recent years. A head mount display, in principle, is designed to enlarge an image displayed on a small-sized display device with an enlarging optical system, and lead the image to an eye of an observer. That is, a head mount display is designed to optically enlarge an image displayed on a display device, and allow a user to observe the image as an enlarged virtual image.

As this type of head mount display, an optically-transmissive head mount display designed to enable an observer to observe not only the above mentioned virtual image but also an outside image is known. This optically-transmissive head mount display is designed to superimpose an image displayed on a display device onto an outside image and lead the image to an eye of an observer with an optical system.

The visibility of a virtual image reproduced by this optically-transmissive head mount display depends on the environment in which this virtual image is displayed. For example, inconsistency between the display state of this virtual image and the state of the real world hinders comfortable observation, or the visibility of the virtual image is lowered depending on the display position thereof.

Patent Document 1 discloses adjusting the depth of an entire image by taking into account to which object the observer is paying attention, for example. Patent Document 2 discloses adjusting the disparity of a virtual image in accordance with convergence of the eyes by using an eye-gaze tracking technique, for example.

CITATION LIST

Patent Document

Patent Document 1: JP 05-328408 A
Patent Document 2: JP 10-188034 A

SUMMARY OF THE INVENTION

Problems to be Solved by the Invention

By the techniques disclosed in Patent Documents 1 and 2, the position in which a virtual image is displayed, and the size of the virtual image are not taken into consideration. Furthermore, the techniques disclosed in Patent Documents 1 and 2 do not teach display of a stereoscopic (3D) image as a virtual image.

The present technique aims to superimpose and display a display image on an outside image in a preferred manner.

Solutions to Problems

A concept of the present technique lies in an image display apparatus that includes:

an optical system that superimposes a display image displayed on a display device onto an outside image, and leads the display image to an eye of an observer; and a display control unit that controls a display size and a display position of the display image on the display device so that the display image is displayed in an image superimposition region detected from the outside image.

In the present technique, the image displayed on the display device is superimposed on the outside image and is led to an eye of an observer by the optical system. In a case where the optical system is an enlarging optical system, the image displayed on the display device is optically enlarged, and is observed as an enlarged virtual image by the observer.

The display control unit controls the display size and the display position of the display image to be superimposed and displayed on the outside image. In this case, the display size and the display position of the display image on the display device are controlled so that the display image is displayed in an image superimposition region detected from the outside image.

The image superimposition region is detected based on captured image data obtained by forming the outside image, for example. In this case, a flat region included in the outside image is detected as the image superimposition region, for example. This detection of the image superimposition region may be performed in a cloud, for example.

The display control unit may control the display size and the display position of the display image by processing (geometrically transforming) image data for displaying the display image on the display device based on information about the image superimposition region, for example. In this case, the display size and the display position of the display image are electronically controlled, and such control is easier.

In the present technique described above, display control is performed so that the display image is displayed in the image superimposition region such as a flat region detected from the outside image. Accordingly, it becomes easier for the observer to visually recognize the display image superimposed and displayed on the outside image.

In the present technique, the display control unit may control the display state of the display image in accordance with the state of the image superimposition region in the outside image, for example. The display control unit may correct the image data for displaying the display image in accordance with the state of the image superimposition region so that elements of the outside image are removed from the display image to be observed by the observer, for example. In this case, the visibility of the display image can be increased, regardless of the state of the outside image.

In the present technique, the display control unit may change manners of display of the display image when the image superimposition region is not detected from the outside image, for example. The display is stopped, for example. Alternatively, the user is made to select a superimposition position, and the display image is displayed in that position in a superimposed manner, for example. Alternatively, the display image is displayed in a preset superimposition position in a superimposed manner, for example. Alternatively, the display image is displayed in the superimposition position in which the display image is previously displayed, for example. Alternatively, the display position is changed or the display is switched on and off in accordance with the duration of non-detection time, for example.

In the present technique, the display control unit may obtain the display size and the display position for the control by performing temporal smoothing on display sizes and display positions on the display device, the display sizes and the display positions being determined by the image superimposition region that is cyclically detected. In this case, even if there is a large change in the position or the size of the image superimposition region cyclically detected for each frame, for example, the display image can be stably superimposed and displayed on the outside image.

In the present technique, the display control unit may also change manners of display of the display image when a change in the outside image is detected, for example. The display is stopped, for example. Alternatively, the user is made to select a superimposition position, and the display image is displayed in that position in a superimposed manner, for example. Alternatively, the display image is displayed in a preset superimposition position in a superimposed manner, for example. Alternatively, the display image is displayed in the superimposition position in which the display image is previously displayed, for example. Alternatively, the display position is changed or the display is switched on and off in accordance with the duration of change detection, for example.

In the present technique, the optical system may include a first optical system that superimposes a left-eye image displayed on a first display device onto an outside image and leads the left-eye image to the left eye of the observer, and a second optical system that superimposes a right-eye image displayed on a second display device onto the outside image and leads the right-eye image to the right eye of the observer, for example. The display control unit may control disparities of the left-eye image and the right-eye image so that the depth position of the stereoscopic image to be perceived by the observer through the left-eye image and the right-eye image is located closer to the front side than the depth position of the region on which the stereoscopic image is to be superimposed in the outside image, for example. In this case, the display image (stereoscopic image) can be superimposed and displayed on the outside image without causing any inconsistency in depth.

Another concept of the present technique lies in an image display apparatus that includes:

an optical system that superimposes a display image displayed on a display device onto an outside image, and leads the display image to an observer; and a display control unit that has a first control mode for performing control so that the display image is displayed in a region on which a line of sight of the observer concentrates in the outside image, and a second control mode for performing control so that the display image is displayed in a region outside the region on which the line of sight of the observer concentrates in the outside image.

In the present technique, the image displayed on the display device is superimposed on the outside image and is led to an eye of an observer by the optical system. In a case where the optical system is an enlarging optical system, the image displayed on the display device is optically enlarged, and is observed as an enlarged virtual image by the observer.

The display control unit controls display of the display image to be superimposed and displayed on the outside image in the first control mode or the second control mode. In the first control mode, control is performed so that the display image is displayed in the region on which the line of sight of the observer concentrates in the outside image. In the second control mode, control is performed so that the display image is displayed in a region outside the region on which the line of sight of the observer concentrates in the outside image.

As described above, in the present technique, display of the display image to be superimposed and displayed on the outside image can be controlled in the first control mode or the second control mode. That is, the display image can be displayed in the region on which the line of sight of the observer concentrates in the outside image, and the display image can be displayed in a region outside the region on which the line of sight of the observer concentrates in the outside image, so that the display of the display image does not obstruct any activity.

In the present technique, the display control unit may perform control in the first control mode when the observer is not moving, and perform control in the second control mode when the observer is moving, for example. In this case, when the observer is not moving, control is automatically switched to the first control mode, and the display image is displayed in the region on which the line of sight of the observer concentrates in the outside image. That is, the observer does not need to switch modes to concentrate on the display image in this case, and accordingly, higher user friendliness is achieved.

In the present technique, the display control unit may change manners of display of the image in accordance with the state of the region on which the display image is to be superimposed in the outside image, for example. The display control unit may correct the image data for displaying the display image in accordance with the state of the region so that elements of the outside image are removed from the display image to be observed by the observer, for example. In this case, the visibility of the display image can be increased, regardless of the state of the outside image.

In the present technique, the optical system may include a first optical system that superimposes a left-eye image displayed on a first display device onto an outside image and leads the left-eye image to the left eye of the observer, and a second optical system that superimposes a right-eye image displayed on a second display device onto the outside image and leads the right-eye image to the right eye of the observer, for example. The display control unit may control (adjust) the disparities of the left-eye image and the right-eye image so that the depth position of a stereoscopic image to be perceived by the observer through the left-eye image and the right-eye image is located closer to the front side than the depth position of the region on which the stereoscopic image is to be superimposed in the outside image, for example. In this case, the display image (stereoscopic image) can be superimposed and displayed on the outside image without causing any inconsistency in depth.

Yet another concept of the present technique lies in an image display apparatus that includes:

an optical system that superimposes a display image displayed on a display device onto an outside image, and leads the display image to an eye of an observer; and a display control unit that changes the display state of the display image in accordance with the state of the region on which the display image is to be superimposed in the outside image.

In the present technique, the image displayed on the display device is superimposed on the outside image and is led to an eye of an observer by the optical system. In a case where the optical system is an enlarging optical system, the image displayed on the display device is optically enlarged, and is observed as an enlarged virtual image by the observer.

The display control unit changes the display state of the display image in accordance with the state of the region on which this display image is to be superimposed in the outside image. The state of the region in the outside image is acquired based on captured image data obtained by forming the outside image, for example. The state of the region in the outside image may be acquired in a cloud, for example. The display control unit may correct the image data for displaying the display image in accordance with the state of the region so that elements of the outside image are removed from the display image to be observed by the observer, for example.

As described above, in the present technique, the display state of the display image is changed in accordance with the state of the region on which this display image is to be superimposed in the outside image. Accordingly, components of the outside image can be removed from the display image to be observed by the observer, and the visibility of the display image can be increased, regardless of the state of the outside image.

Still another concept of the present technique lies in an image display apparatus that includes:

a first optical system that superimposes a left-eye image displayed on a first display device onto an outside image, and leads the left-eye image to the left eye of an observer;

a second optical system that superimposes a right-eye image displayed on a second display device onto the outside image, and leads the right-eye image to the right eye of the observer; and a display control unit that controls the disparities of the left-eye image and the right-eye image so that the depth position of the stereoscopic image to be perceived by the observer through the left-eye image and the right-eye image is located closer to the front side than the depth position of the region on which the stereoscopic image is to be superimposed in the outside image.

In the present technique, the left-eye image displayed on the first display device is superimposed on the outside image and is led to the left eye of the observer by the first optical system. Likewise, the right-eye image displayed on the second display device is superimposed on the outside image and is led to the right eye of the observer by the second optical system. In a case where the optical systems are enlarging optical systems, the left-eye image and the right-eye image are optically enlarged, and are observed as enlarged virtual images by the observer.

The display control unit controls the disparities of the left-eye image and the right-eye image. In this case, the disparities of the left-eye image and the right-eye image are controlled (adjusted) so that the depth position of the stereoscopic image to be perceived by the observer through the left-eye image and the right-eye image is located closer to the front side than the depth position of the region on which the stereoscopic image is to be superimposed in the outside image.

As described above, in the present technique, the disparities of the left-eye image and the right-eye image are controlled based on the depth position of the region in the outside image on which the display image (stereoscopic image) is to be superimposed, so that the depth position of the display image (stereoscopic image) becomes closer to the front side than the depth position of the region. Accordingly, the display image (stereoscopic image) can be superimposed and displayed on the outside image without causing any inconsistency in depth.

Effects of the Invention

According to the present technique, a display image can be superimposed and displayed on an outside image in a preferred manner.

MODES FOR CARRYING OUT THE INVENTION

The following is a mode for carrying out the invention (hereinafter referred to as the "embodiment"). Explanation will be made in the following order.

1. Embodiment
2. Modifications

<1. Embodiment>

[Example Structure of an Optically-Transmissive Head Mount Display]

Figure 1:
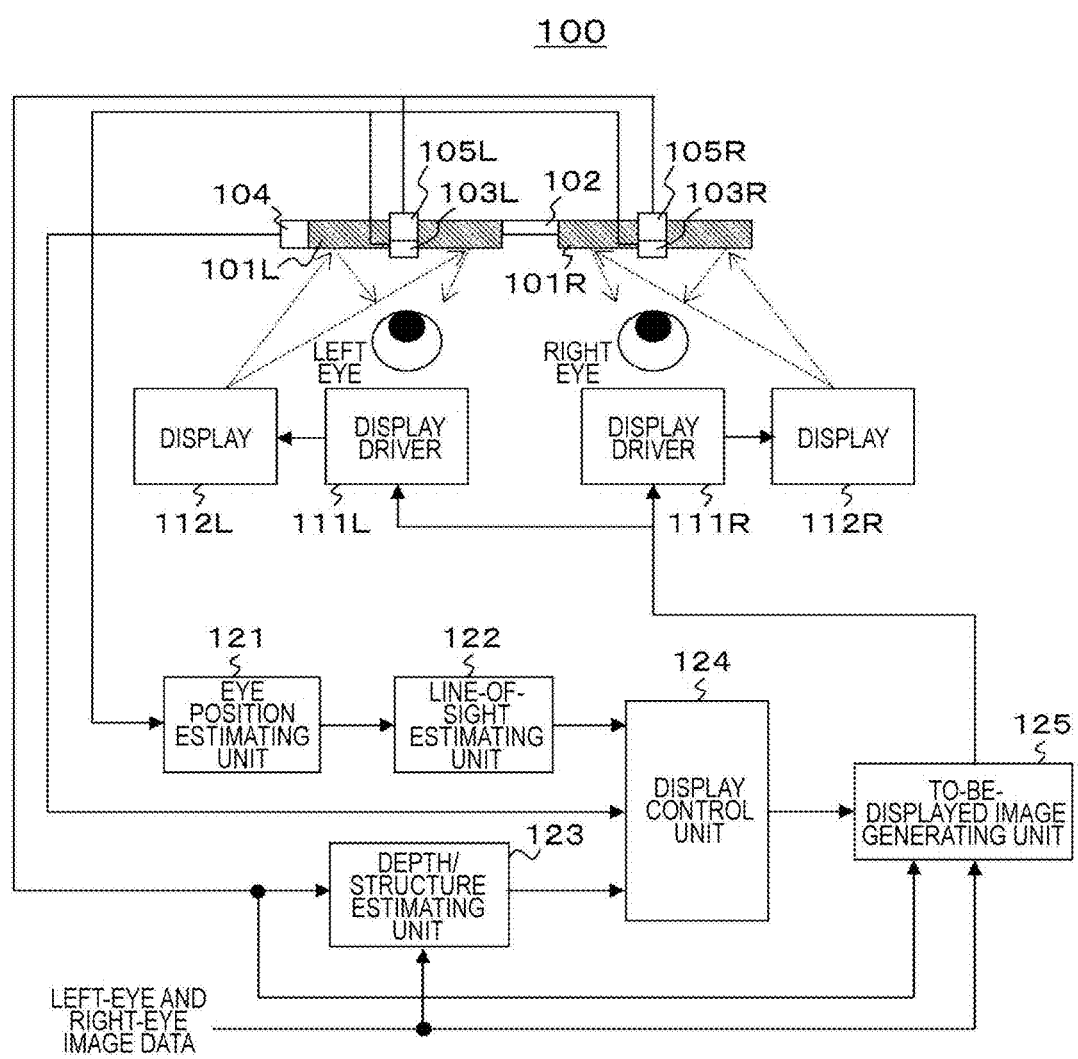
FIG. 1 is a diagram showing a schematic example structure of an optically-transmissive (binocular) head mount display as an embodiment.

FIG. 1 schematically shows an example structure of a head mount display (HMD) 100 of an optically-transmissive type as an embodiment. This example structure is a binocular HMD. This HMD 100 includes a left glass lens unit 101L and a right glass lens unit 101R. The glass lens unit 101L and the glass lens unit 101R are integrally connected by a connecting member 102.

Each of the glass lens units 101L and 101R is formed by integrating a glass lens and a holographic optical element (HOE) sheet. This HOE sheet has a half-mirror-like function to combine outside light and display light, and a function of a concave surface or an adjustable surface to enlarge a display image.

Infrared sensors 103L and 103R are attached to the glass lens units 101L and 101R, respectively. The infrared sensor 103L is provided in the center position of the glass lens unit 101L in the horizontal direction (the center position of the left-eye optical system in the horizontal direction), for example. The infrared sensor 103R is also provided in the center position of the glass lens unit 101R in the horizontal direction (the center position of the right-eye optical system in the horizontal direction), for example.

Sensor outputs of the infrared sensors 103L and 103R are used for estimating eye positions by a scleral reflection method. The scleral reflection method is a method that utilizes a difference in reflectance between the cornea (the black part of the eye) and the sclera (the white part of the eye). In this case, an infrared sensor horizontally scans weak infrared rays emitted onto an eye of an observer, and detects the reflected light. Since there is a large difference between the intensity of the light reflected from the cornea (the black part of the eye) and the intensity of the light reflected from the sclera (the white part of the eye), the position of the eye of the observer can be estimated from a sensor output.

A gyro sensor 104 is also attached to the glass lens unit 101L. A sensor output of the gyro sensor 104 is used for determining whether there is a change in the image of the outside, and whether the observer (user) is moving. A sensor output of the gyro sensor 104 is also used for determining whether there is a change in the image of the outside being observed by the observer through the glass lens units 101L and 101R.

A camera 105L is also provided in the center position of the glass lens unit 101L in the horizontal direction (the center position of the left-eye optical system in the horizontal direction). The camera 105L captures an image (left-eye imagery) of the outside being observed with the left eye of the observer through the glass lens unit 101L, and outputs the captured image data. Likewise, a camera 105R is also provided in the center position of the glass lens unit 101R in the horizontal direction (the center position of the right-eye optical system in the horizontal direction). The camera 105R captures an image (right-eye imagery) of the outside being observed with the right eye of the observer through the glass lens unit 101R, and outputs the captured image data.

Outputs of the cameras 105L and 105R are used for obtaining information about the depth position of an outside image on which a stereoscopic image is to be superimposed and displayed. Outputs of the cameras 105L and 105R are also used for determining whether there is a change in the image of the outside being observed by the observer through the glass lens units 101L and 101R. Outputs of the cameras 105L and 105R are used for obtaining information (such as luminance information and color information) indicating the state of an outside image on which a stereoscopic image is to be superimposed and displayed. Outputs of the cameras 105L and 105R are also used for detecting an image superimposition region, or a flat region in this embodiment, from an outside image.

The HMD 100 also includes display drivers 111L and 111R, and displays 112L and 112R. Each of the displays 112L and 112R is formed with a liquid crystal display (LCD), for example. The display 112L is driven by the display driver 111L based on left-eye image data, and displays a left-eye image for making the observer perceive a stereoscopic image. The display 112R is driven by the display driver 111R based on right-eye image data, and displays a right-eye image for making the observer perceive a stereoscopic image.

The HMD 100 also includes an eye position estimating unit 121, a line-of-sight estimating unit 122, a depth/structure estimating unit 123, a display control unit 124, and a to-be-displayed image generating unit 125. The eye position estimating unit 121 estimates positions of the left eye and the right eye of the observer based on sensor outputs from the infrared sensors 103L and 103R. The line-of-sight estimating unit 122 estimates a line of sight of the observer based on the result of the left-eye and right-eye position estimation performed by the eye position estimating unit 121.

Figure 2:
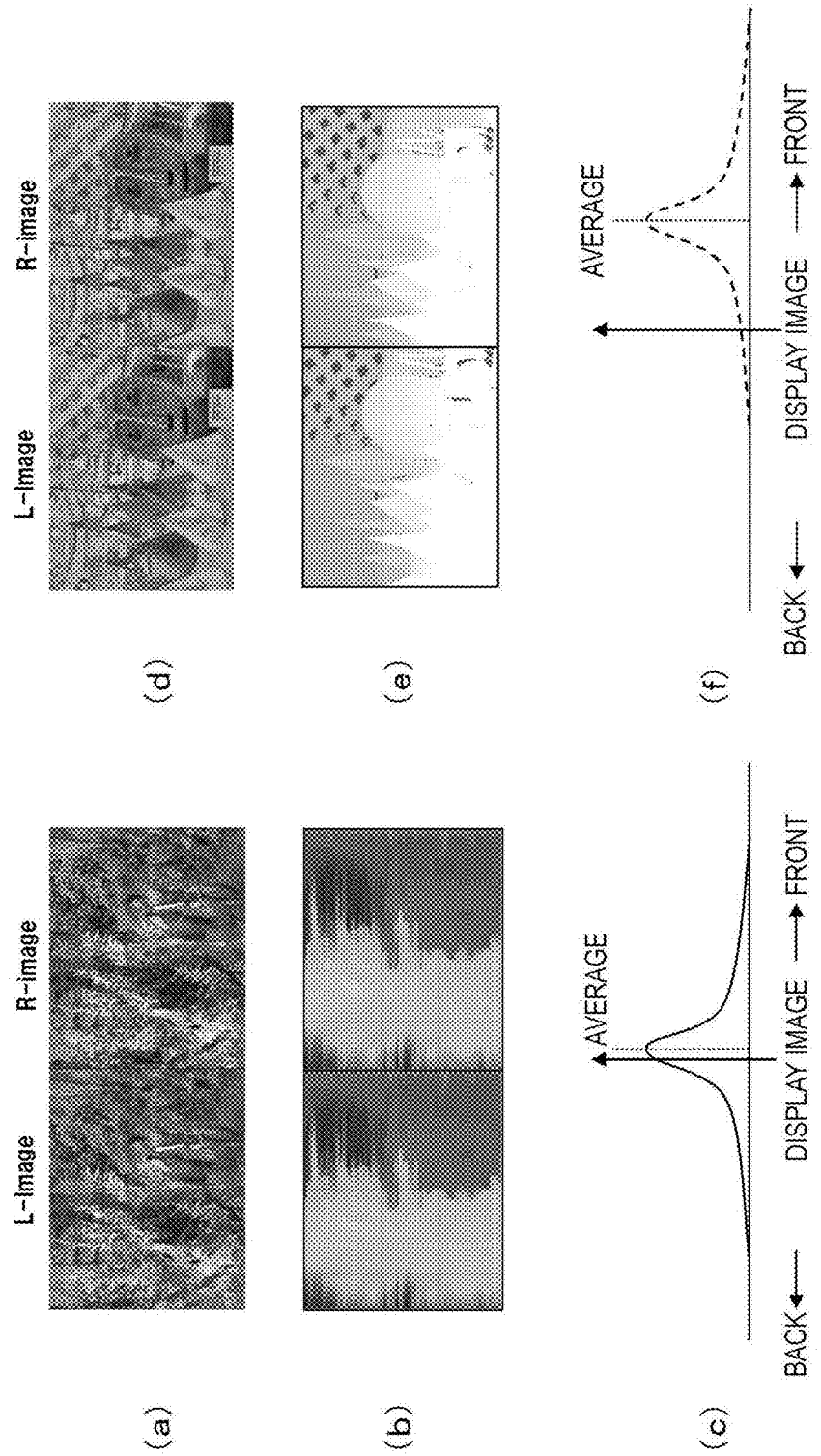
FIGS. 2(a) to 2(f) are diagrams for explaining a disparity map indicating the depth positions of the respective pixels in an outside image and a disparity map indicating the depth positions of the respective pixels in a display image (a stereoscopic image).

The depth/structure estimating unit 123 calculates a disparity map indicating the depth position of each pixel in an outside image based on captured image data from the cameras 105L and 105R. FIG. 2(a) shows an example of the left-eye imagery and the right-eye imagery of an outside image, and FIG. 2(b) shows an example of a disparity map corresponding to the left-eye imagery and the right-eye imagery. This example is an image formed by displaying the disparities of the respective pixels as pixel data, and brighter portions are shown in depth positions that are closer to the front side. FIG. 2(c) shows an example of a disparity histogram of the entire screen.

The depth/structure estimating unit 123 also calculates a disparity map that indicates the depth positions of the respective pixels in a display image (a stereoscopic image) based on left-eye and right-eye image data serving as display image data. FIG. 2(d) shows an example of a left-eye image and a right-eye image, and FIG. 2(e) shows an example of a disparity map corresponding to the left-eye image and the right-eye image. This example is also an image formed by displaying the disparities of the respective pixels as pixel data, and brighter portions are shown in depth positions that are closer to the front side. FIG. 2(f) shows an example of a disparity histogram of the entire screen.

The depth/structure estimating unit 123 also detects an image superimposition region from an outside image based on captured image data from the cameras 105L and 105R. The depth/structure estimating unit 123 detects a region containing only low-frequency components in the horizontal direction and the vertical direction (a flat region) as an image superimposition region, for example. This image superimposition region is of course a region in which a display image is to be displayed in a superimposed manner, and therefore, has a sufficient size in both the horizontal direction and the vertical direction. In this case, not only one image superimposition region but more than one image superimposition region may be detected from an outside image.

The depth/structure estimating unit 123 also determines a display size and a display position of a display image based on the detected image superimposition region. Performing the above described image superimposition region detection cyclically or for each frame, for example, the depth/structure estimating unit 123 also determines a display size and a display position of a display image for each frame.

Figure 3:
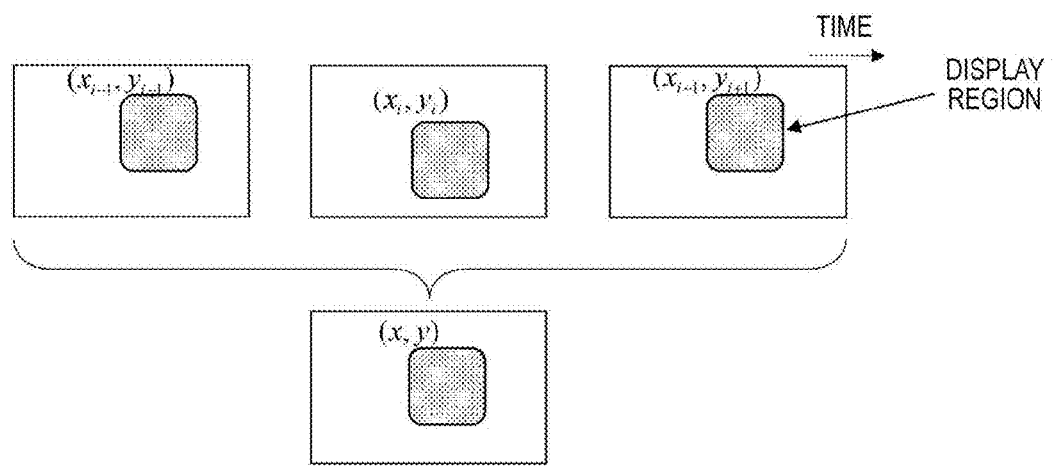
FIG. 3 is a diagram for explaining a temporal smoothing process for the display size and the display position for display control on a display image.

So as to stabilize a display size and a display position of a display image, the depth/structure estimating unit 123 performs temporal smoothing on the display sizes and display positions determined for the respective frames, and determines the display size and the display position for display control. FIG. 3 shows an example of a temporal smoothing process for a display position. Coordinate filtering (such as averaging, IIR, majority operation, or the like) is performed to achieve temporal stabilization. In the case of filtering for averaging, for example, the coordinates (x, y) of the display region that is actually used are determined based on the mathematical formula (1) shown below.

[Mathematical Formula 1]

$$(x, y) = \left(\frac{1}{N}\sum x_i, \frac{1}{N}\sum y_i\right) i = 0, \dots, N-1 \quad (1)$$

The depth/structure estimating unit 123 also determines a depth position of a display image (a stereoscopic image) based on the display size and the display position for display control that are determined in the above described manner. In this case, the depth/structure estimating unit 123 determines the depth position of a display image so that the depth position of the display image is located closer to the front side than the depth position of the region in which the display image is to be displayed in a superimposed manner in the outside image.

Figure 4:
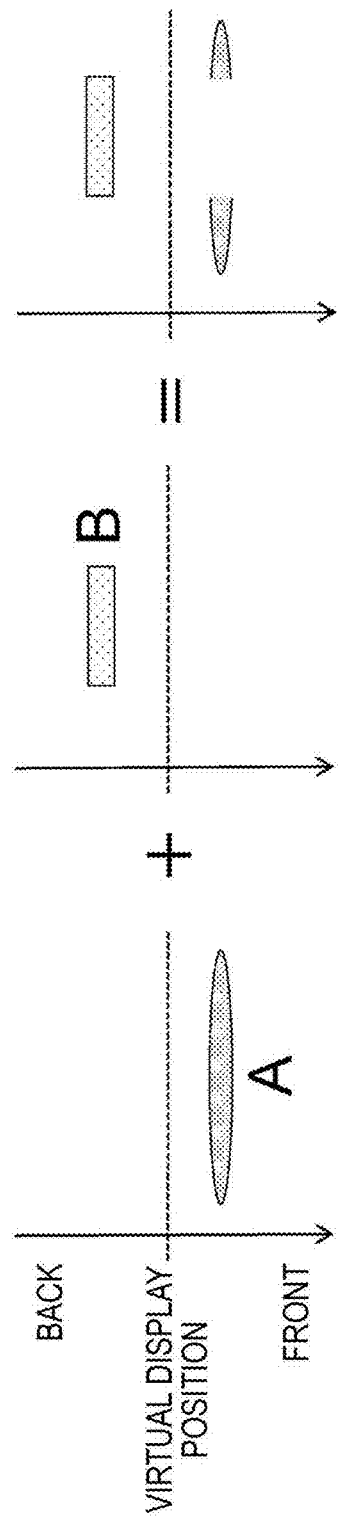
FIG. 4 is a diagram for explaining a case where there is inconsistency in the sense of depth with respect to the depth position of a display image (a stereoscopic image).

A depth position is determined as described above, so as to avoid any inconsistency in the sense of depth when a display image (a stereoscopic image) is superimposed and displayed on an image of the outside, which is the real world. FIG. 4 schematically shows a case where an inconsistency is caused. If superimposed display is performed in a case where the depth position of an object A in an outside image is closer to the front side while the depth position of an object B in a display image is closer to the back side, the object A is divided by the object B, giving the observer an unnatural sense of depth. Such an inconsistence in the sense of depth makes the observer feel tired, for example.

Figure 5:
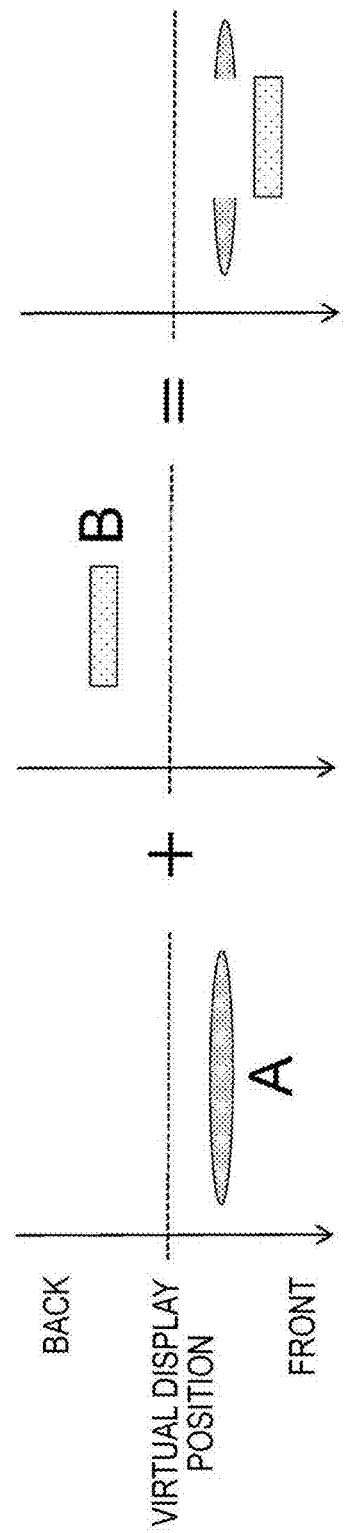
FIG. 5 is a diagram for explaining a case where there is no inconsistency in the sense of depth with respect to the depth position of a display image (a stereoscopic image).

FIG. 5 schematically shows that an inconsistency in the sense of depth is avoided by placing a display image (a stereoscopic image) in a depth position that is closer to the front side than the region in which the display image is to be displayed in a superimposed manner in the outside image. As the depth position of the object B is made closer to the front side than the depth position of the object A in the case where the depth position of the object A in the outside image is closer to the front side while the depth position of the object B in the display image is closer to the back side, the observer can have a natural sense of depth even if the object A is divided by the object B. As the sense of depth is adjusted in this manner, the observer can comfortably observe the objects without feeling tired.

Specifically, the depth/structure estimating unit 123 determines disparities to be given to the left-eye image and the right-eye image. The depth/structure estimating unit 123 determines Ha, which is the average of disparities in the region in which a display image having a display size and a display position determined as described above is displayed in a superimposed manner in the outside image. The depth/structure estimating unit 123 also determines Hb, which is the average of disparities in the entire display image having the display size determined as described above. It should be noted that Hb can be obtained by calculating the average (see FIG. 2(f)) of the disparities in the display image prior to the above described size adjustment by n (n being the magnification of the display size).

Figure 6:
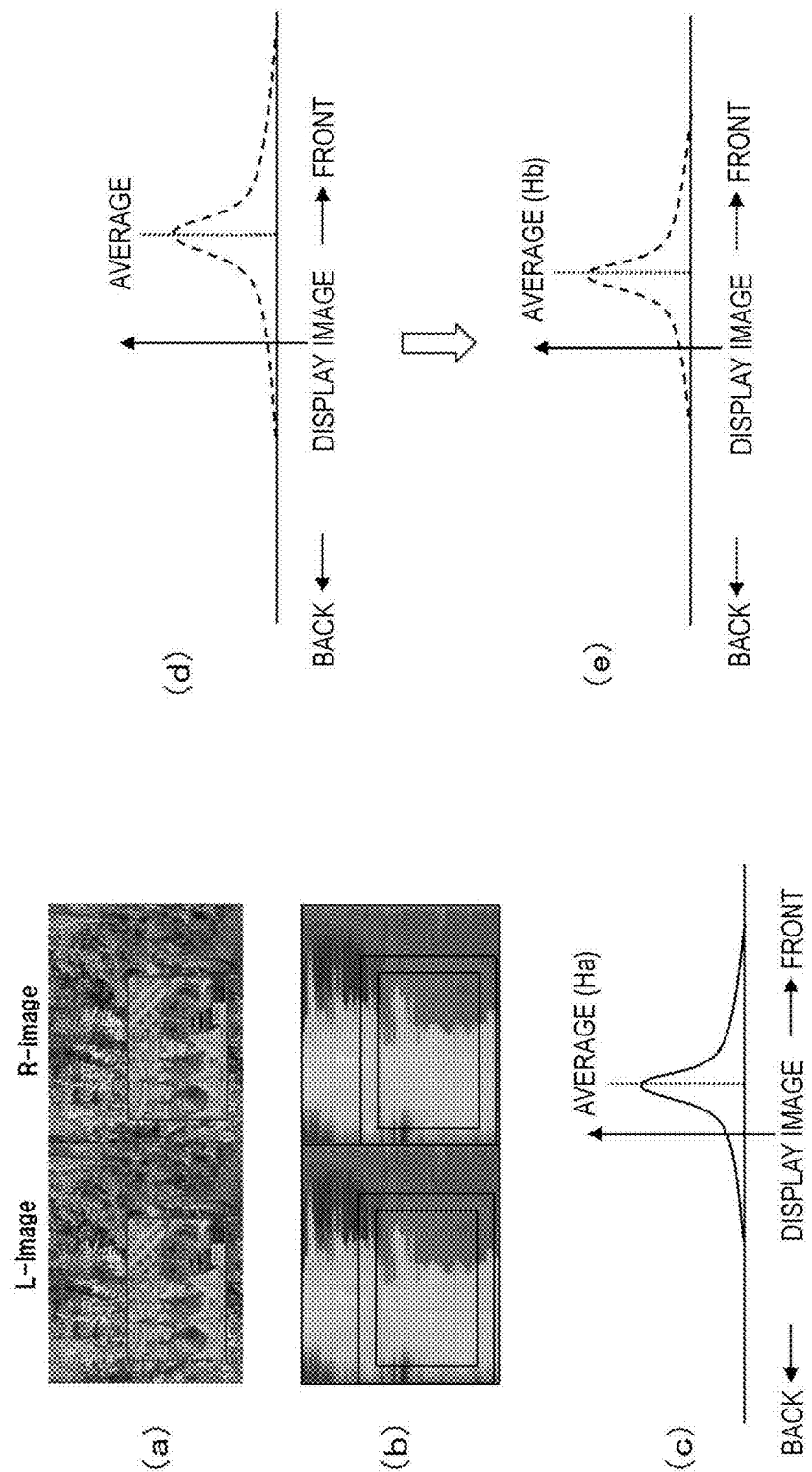
FIGS. 6(a) to 6(e) are diagrams for explaining an example process to be performed to adjust the depth position of a display image (a stereoscopic image) so as not to cause inconsistency in the sense of depth.

For example, a case where a display image is superimposed on an outside image and is displayed as shown in FIG. 6(a) is now described. In this case, the disparities in the regions (indicated by rectangular frames) in which the left-eye image and the right-eye image of the display image are displayed in a superimposed manner in a disparity map of the left-eye imagery and the right-eye imagery of the outside image are used as shown in FIG. 6(b), and the average of the disparities is Ha as shown in FIG. 6(c).

Each of the rectangular frames is drawn with two lines in FIG. 6(b), with the inner line matching the display size and the display position determined as described above, the outer line being determined by adding a margin to the inner line. The outer rectangular frames are used as regions for obtaining Ha. This is because disparity adjustment might be performed by changing the relative positions of the left-eye image and the right-eye image as will be described later, as the depth position of the display image (the stereoscopic image) is made closer to the front side than the depth position of the outside image.

FIG. 6(d) shows a disparity histogram (the same as FIG. 2(f)) of the entire display image prior to the size adjustment. FIG. 6(e) shows a disparity histogram of the entire display image after the display size is divided by n, and the average Hb of the disparities is n times larger than the disparities in the entire display screen prior to the size adjustment.

The depth/structure estimating unit 123 compares the disparity average Ha related to the outside image that is determined in the above described manner, with the disparity average Hb related to the display image. The depth/structure estimating unit 123 then determines whether the depth position of the display image (the stereoscopic image) is located closer to the front side than the depth position of the corresponding region in the outside image by a certain distance or more, or whether the disparity average difference of the disparity average Hb with respect to the disparity average Ha is H0 or larger, which satisfies the above condition.

Figure 7:
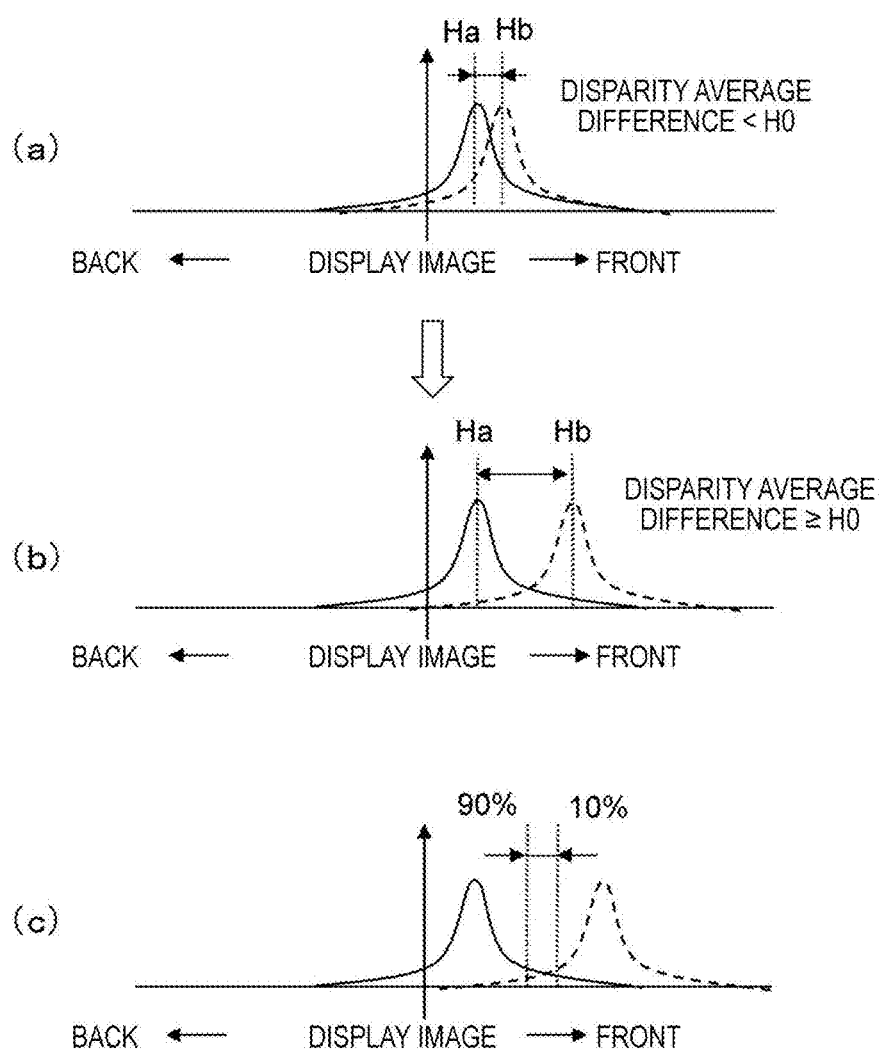
FIGS. 7(a) to 7(c) are diagrams for explaining an example process to be performed to adjust the depth position of a display image (a stereoscopic image) so as not to cause inconsistency in the sense of depth.

When the disparity average difference is smaller than H0, the depth/structure estimating unit 123 adjusts one or both of the display positions of the left-eye image and the right-eye image in the horizontal direction, so as to make the disparity average Hb have a disparity average difference equal to or larger than H0. FIG. 7(a) shows an example of the disparity averages Ha and Hb prior to display position adjustment, and shows a case where the disparity average difference is smaller than H0. In this case, one or both of the display positions of the left-eye image and the right-eye image in the horizontal direction are adjusted so that the disparity average difference is made equal to or larger than H0 as shown in FIG. 7(b).

In the above description, one or both of the display positions of the left-eye image and the right-eye image in the horizontal direction are adjusted so that the disparity average difference of the disparity average Hb with respect to the disparity average Ha becomes equal to or larger than H0. Instead, as shown in FIG. 7(c), one or both of the display positions of the left-eye image and the right-eye image in the horizontal direction may be adjusted so that a difference between 90% of the disparities in the disparity histogram of the outside image and 10% of the disparities in the disparity histogram of the display image becomes equal to or larger than a predetermined threshold value, for example.

The display control unit 124 controls display of the display image based on the result of the line-of-sight estimation performed by the line-of-sight estimating unit 122, a sensor output of the gyro sensor 104, information about the display size and the display position of the display image determined by the depth/structure estimating unit 123, and the like. Although not shown in the drawings, a user operation signal is also supplied to the display control unit 124.

In a case where an instruction to display the display image is issued through a user operation, the display control unit 124 basically controls display of the display image so that the display image is displayed in the display size and the display position determined by the depth/structure estimating unit 123.

When any flat region that is an image superimposition region is not detected by the depth/structure estimating unit 123, or when any information about a display size and a display position is not supplied from the depth/structure estimating unit 123, the display control unit 124 changes display conditions.

The display control unit 124 performs control so that display of the display image is stopped, for example. Alternatively, the display condition control unit 124 performs control to make the user select a superimposition position so that the display image is displayed in that position, for example. Alternatively, the display condition control unit 124 performs control so that the display image is displayed in a preset superimposition position, for example. Alternatively, the display condition control unit 124 performs control so that the display image is displayed in the previously displayed superimposition position, for example.

The display control unit 124 also controls the display position of the display image or switching on and off of the display of the display image in accordance with the duration of non-detection time. In this case, control is performed so that the display image is displayed in the previous display position until the duration reaches a first point of time, control is performed so that the display image is displayed in a preset position until the duration reaches a second point of time after reaching past the first point of time, and control is performed so that the display is stopped when the duration is past the second point of time.

The display control unit 124 also changes display conditions when a check is made to determine whether there is a change in the outside image and a change is detected based on the gyro sensor 104. The display condition control unit 124 performs control so that display of the display image is stopped, for example. Alternatively, the display condition control unit 124 performs control to make the user select a superimposition position so that the display image is displayed in that position, for example. Alternatively, the display condition control unit 124 performs control so that the display image is displayed in a preset superimposition position, for example. Alternatively, the display condition control unit 124 performs control so that the display image is displayed in the previously displayed superimposition position, for example.

The display control unit 124 also controls the display position of the display image or switching on and off of the display of the display image in accordance with the duration of change. In this case, control is performed so that the display image is displayed in the previous display position until the duration reaches a first point of time, control is performed so that the display image is displayed in a preset position until the duration reaches a second point of time after reaching past the first point of time, and control is performed so that the display is stopped when the duration is past the second point of time.

The display control unit 124 also changes display conditions based on a line-of-sight estimation result from the line-of-sight estimating unit 122. In accordance with a mode that is set by the user (the observer), the display condition control unit 124 performs control in the manner described below. The user can set "automatic control mode", "first control mode", or "second control mode".

Where "first control mode" is set, the display control unit 124 performs control so that the display image is displayed in the region on which the line of sight concentrates or the region that matches the line of sight. Where "second control mode" is set, the display control unit 124 performs control so that the display image is displayed in a region outside the region on which the line of sight concentrates or a region outside the region that matches the line of sight.

Where "automatic control mode" is set, the display control unit 124 performs control in the manner described below depending on whether the user (observer) is moving. Specifically, when the user is not moving, the display control unit 124 performs control so that the display image is displayed in the region on which the line of sight concentrates as in a case where "first control mode" is set. When the user is moving, the display control unit 124 performs control so that the display image is displayed in a region outside the region on which the line of sight concentrates as in a case where "second control mode" is set. The display control unit 124 determines whether the observer is moving based on a sensor output of the gyro sensor 104.

Under the control of the display control unit 124, the to-be-displayed image generating unit 125 generates left-eye and right-eye image data for display so that the display image is displayed in the display size and the display position determined by the depth/structure estimating unit 123 at the time of display of the display image. In this case, a reduction process and a moving process (a geometric transformation process) are performed on left-eye and right-eye image data supplied from outside, to obtain the left-eye and right-eye image data for display. Under the control of the display control unit 124, the to-be-displayed image generating unit 125 also corrects the left-eye and right-eye image data for display so that the display state of the display image is changed in accordance with the state of the region on which the display image is to be displayed in the outside image. In this case, the correction is performed so that elements (components) of the outside image are removed from the display image to be observed by the observer.

An example of image data correction to be performed by the to-be-displayed image generating unit 125 is now described. The outside image is represented by Ireal, and the display image is represented by Idisp. Each of Idisp and Ireal is divided into blocks each consisting of (N×N) pixels. The pixel at the coordinates (i, j) in the outside image Ireal is represented by Ireal (i, j), and the pixel at the coordinates (i, j) in the display image Idisp is represented by Idisp (i, j).

As for the data of each pixel in a block of coordinates (s, t), the to-be-displayed image generating unit 125 performs correction as indicated in the mathematical formula (2) shown below. Here, a represents the correction coefficient, and the user (observer) can adjust the value of the correction coefficient as necessary. Also, clip(x) represents a function to perform a saturation calculation on x into a certain value range (0 to 255, for example). Although not described in detail, this pixel data correction is performed on data of the respective colors of red, green, and blue.

[Mathematical Formula 2]

$$I'_{disp}(i, j) = \text{clip}\left(I_{disp}(i, j) - \alpha \frac{1}{N^2} \sum_{(i,j) \in block(s,t)} I_{real}(i, j)\right) \quad (2)$$

As for the second term in the parenthesis, a value obtained by smoothing a correction value of a surrounding block may be used as indicated in the mathematical formula (3) shown below.

[Mathematical Formula 3]

$$\frac{1}{9N^2} \sum_{\substack{-1 \le u \le 1 \\ -1 \le v \le 1}} \sum_{(i,j) \in block(s+u,t+v)} I_{real}(i, j) \qquad (3)$$

Operation of the HMD 100 shown in FIG. 1 is now described. Left-eye image data generated by the to-be-displayed image generating unit 125 is supplied to the display driver 111L. The display 112L is driven by this display driver 111L, and the left-eye image is displayed on this display 112L. Meanwhile, right-eye image data generated by the to-be-displayed image generating unit 125 is supplied to the display driver 111R. The display 112R is driven by this display driver 111R, and the right-eye image is displayed on this display 112R.

The light from the left-eye image displayed on the display 112L is superimposed on the outside image at the glass lens unit 101L, and reaches the left eye of the observer. As a result, the left-eye image superimposed on the outside image (left-eye imagery) is observed with the left eye of the observer. Likewise, the light from the right-eye image displayed on the display 112R is superimposed on the outside image at the glass lens unit 101R, and reaches the right eye of the observer. As a result, the right-eye image superimposed on the outside image (right-eye imagery) is observed with the right eye of the observer. As the left-eye image and the right-eye image superimposed on the outside image are observed with the left eye and the right eye of the observer, respectively, the display image superimposed and displayed on the outside image is perceived as a stereoscopic (3D) image by the observer.

A sensor output of the infrared sensor 103L provided in the center position of the glass lens unit 101L in the horizontal direction (the center position of the left-eye optical system in the horizontal direction) is supplied to the eye position estimating unit 121. Likewise, a sensor output of the infrared sensor 103R provided in the center position of the glass lens 101R in the horizontal direction (the center position of the right-eye optical system in the horizontal direction) is supplied to the eye position estimating unit 121.

The eye position estimating unit 121 estimates positions of the left eye and the right eye of the observer based on the sensor outputs from the infrared sensors 103L and 103R. The line-of-sight estimating unit 122 then estimates a line of sight of the observer based on the result of the left-eye and right-eye position estimation performed by the eye position estimating unit 121. The result of this line-of-sight estimation is supplied to the display control unit 124.

A sensor output of the gyro sensor 104 attached to the glass lens unit 101L is supplied to the display control unit 124. An output (captured left-eye image data) of the camera 105L provided in the center position of the glass lens unit 101L in the horizontal direction (the center position of the left-eye optical system in the horizontal direction) is supplied to the depth/structure estimating unit 123.

Likewise, an output (captured right-eye image data) of the camera 105R provided in the center position of the glass lens unit 101R in the horizontal direction (the center position of the right-eye optical system in the horizontal direction) is supplied to the depth/structure estimating unit 123. The left-eye and right-eye image data, which is the display image data, is further supplied to the depth/structure estimating unit 123.

The depth/structure estimating unit 123 detects a flat region as an image superimposition region from the outside image based on the captured image data from the cameras 105L and 105R. The depth/structure estimating unit 123 then determines a display size and a display position of the display image based on the detected flat region. In this case, temporal smoothing is performed on display sizes and display positions determined for the respective frames, and the display size and the display position of the display image are stabilized.

The depth/structure estimating unit 123 also calculates a disparity map indicating the depth positions of the respective pixels in the outside image based on the captured image data from the cameras 105L and 105R, and calculates a disparity map indicating the depth positions of the respective pixels in the display image (stereoscopic image) based on the left-eye and right-eye image data, which is the display image data. The depth/structure estimating unit 123 then determines the depth position of the display image (stereoscopic image) based on the display size and the display position for display control that are determined in the above described manner, and the disparity maps calculated in the above described manner. In this case, the depth position of the display image is determined so that the display image is located closer to the front side than the depth position of the region in which the display image is to be displayed in a superimposed manner in the outside image.

The depth/structure estimating unit 123 determines whether the depth position of the display image (stereoscopic image) satisfies the condition that the display image is located at a certain distance or longer on the front side from the depth position of the region corresponding to the outside image. If the condition is not satisfied, the depth/structure estimating unit 123 performs disparity adjustment to adjust one or both of the display positions of the left-eye image and the right-eye image in the horizontal direction so that the condition is satisfied. The information about the display size and the display position for display control that are determined by the depth/structure estimating unit 123 in this manner is supplied to the display control unit 124.

The display control unit 124 controls display of the display image based on the result of the line-of-sight estimation performed by the line-of-sight estimating unit 122, the sensor output of the gyro sensor 104, and the information about the display size and the display position determined by the depth/structure estimating unit 123. In this case, the display control unit 124 basically performs control so that the display image is displayed in the display size and the display position determined by the depth/structure estimating unit 123 at the time of display of the display image.

When a flat region as an image superimposition region is not detected by the depth/structure estimating unit 123, the display control unit 124 changes manners of display. When a change in the outside image is detected based on the gyro sensor 104, the display control unit 124 also changes manners of display.

The display control unit 124 also changes manners of display based on the line-of-sight estimation result from the line-of-sight estimating unit 122. This control is performed in accordance with a mode that is set by the user (observer). The user can set "automatic control mode", "first control mode", or "second control mode", for example.

Where "first control mode" is set, control is performed so that the display image is displayed in the region on which the line of sight concentrates. Where "second control mode" is set, control is performed so that the display image is displayed in a region outside the region on which the line of sight concentrates. Where "automatic mode" is set, control is performed so that the display image is displayed outside the region on which the line of sight concentrates when the observer is moving, and control is performed so that the display image is displayed in the region on which the line of sight concentrates when the observer is not moving.

Figure 8:
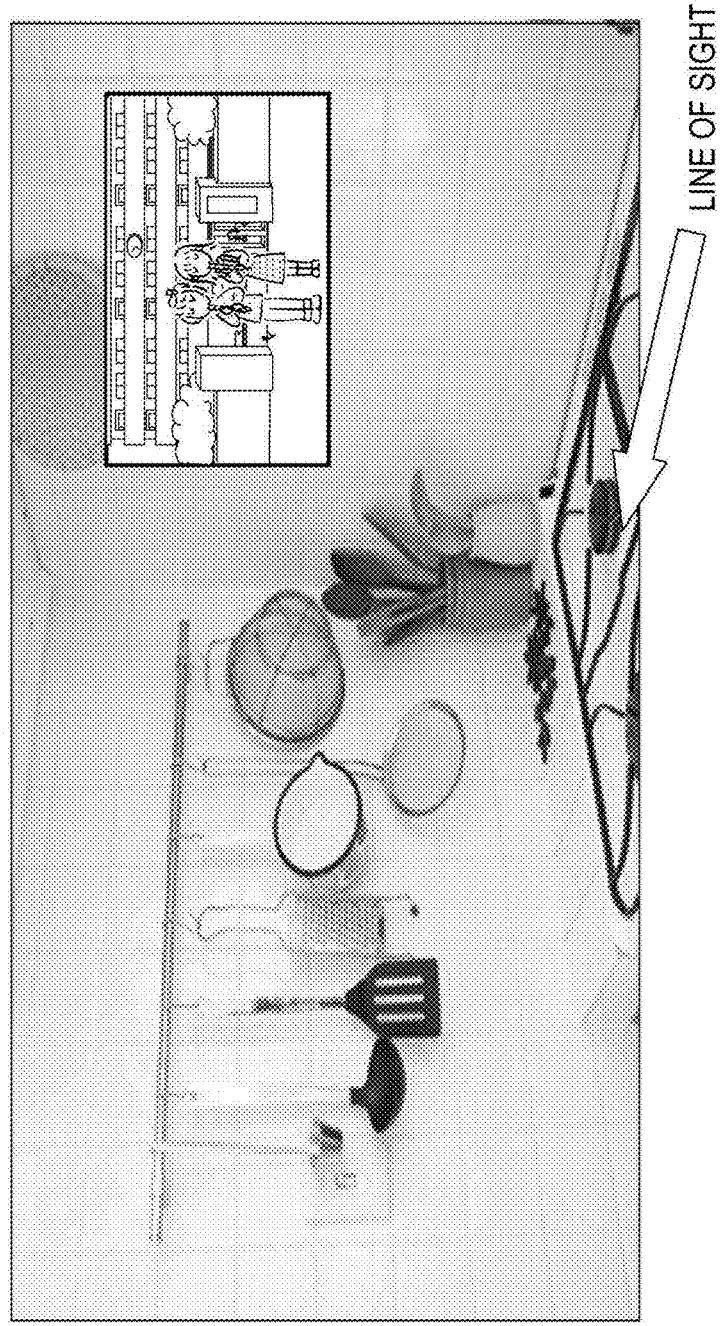
FIG. 8 is a diagram for explaining a case where a display image (a stereoscopic image) is displayed in a region outside the region on which the line of sight of the observer concentrates in an outside image.

As described above, where "second control mode" is set, the display image (stereoscopic image) can be displayed in a region outside the region on which the line of sight of the observer concentrates in the outside image, and the display image can be displayed in such a manner as not to obstruct any activity. In this case, the observer views the display image while doing some other thing. FIG. 8 shows an example of such display. In this example of display, the line of sight of the observer concentrates on the stove in the kitchen, and therefore, the display image is displayed in a wall portion that is away from the stove portion.

The left-eye and right-eye image data, which is the display image data, is supplied to the to-be-displayed image generating unit 125. The captured image data from the cameras 105L and 105R is also supplied to this to-be-displayed image generating unit 125. Under the control of the display control unit 124, the to-be-displayed image generating unit 125 generates the left-eye and right-eye image data for displaying the display image so that the display image is displayed in the determined display size and the determined display position.

In this case, a reduction process and a moving process are performed on left-eye and right-eye image data supplied from outside, to obtain the left-eye and right-eye image data for display. In this case, the display size and the display position are electronically changed. When the display of the display image is stopped, the generation of the left-eye and right-eye image data is stopped.

The to-be-displayed image generating unit 125 also corrects the left-eye and right-eye image data so that the display state of the display image is changed in accordance with the state of the region on which the display image is to be displayed in the outside image (see the mathematical formula (2)). As the image data is corrected in this manner, the visibility of the display image can be increased, regardless of the state of the outside image.

Figure 9:
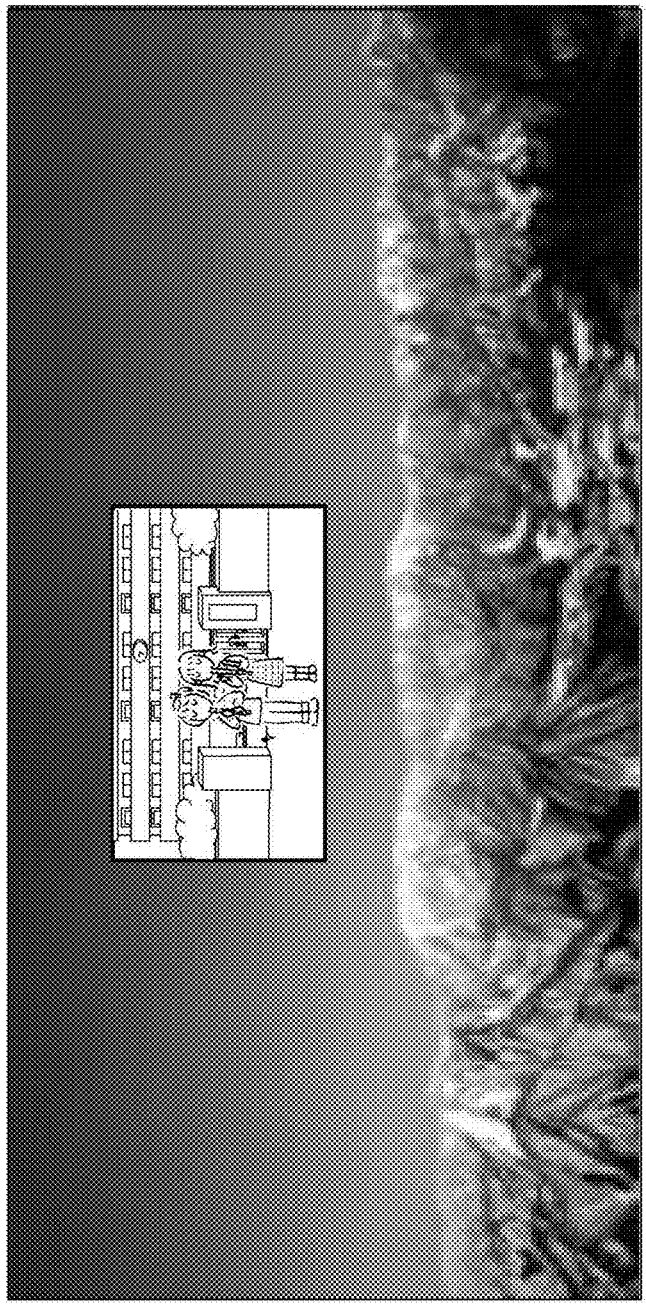
FIG. 9 is a diagram showing an example of superimposed display of a display image (a stereoscopic image) on a blue-sky portion in an outside image.

FIG. 9 shows an example of superimposed display of a display image (a stereoscopic image) on a blue-sky portion in an outside image. If the image data has not been corrected in such a case, the display image appears bluish to the observer due to influence of the blue sky. However, as the image data is corrected in this embodiment, the influence of the blue sky is reduced, and the observer can view the display image in a preferred state.

The left-eye image data for display generated by the to-be-displayed image generating unit 125 is supplied to the display driver 111L, and the left-eye image corresponding to this left-eye image data is displayed on the display 112L. The right-eye image data for display generated by the to-be-displayed image generating unit 125 is supplied to the display driver 111R, and the right-eye image corresponding to this right-eye image data is displayed on the display 112R.

As a result, the left-eye image and the right-eye image superimposed on the outside image are observed with the left eye and the right eye of the observer, respectively, and the display image (stereoscopic image) superimposed and displayed in an appropriate position and an appropriate size on the outside image is perceived in a depth position in front of the outside image by the observer.

In this case, the display image is basically displayed in an image superimposition region such as a flat region detected from the outside image, and accordingly, it becomes easier for the observer to visually recognize the display image superimposed and displayed on the outside image. An example case where the outside image is the one shown in FIG. 10(*a*) and the display image is the one shown in FIG. 10(*b*) is now described.

Figure 10:
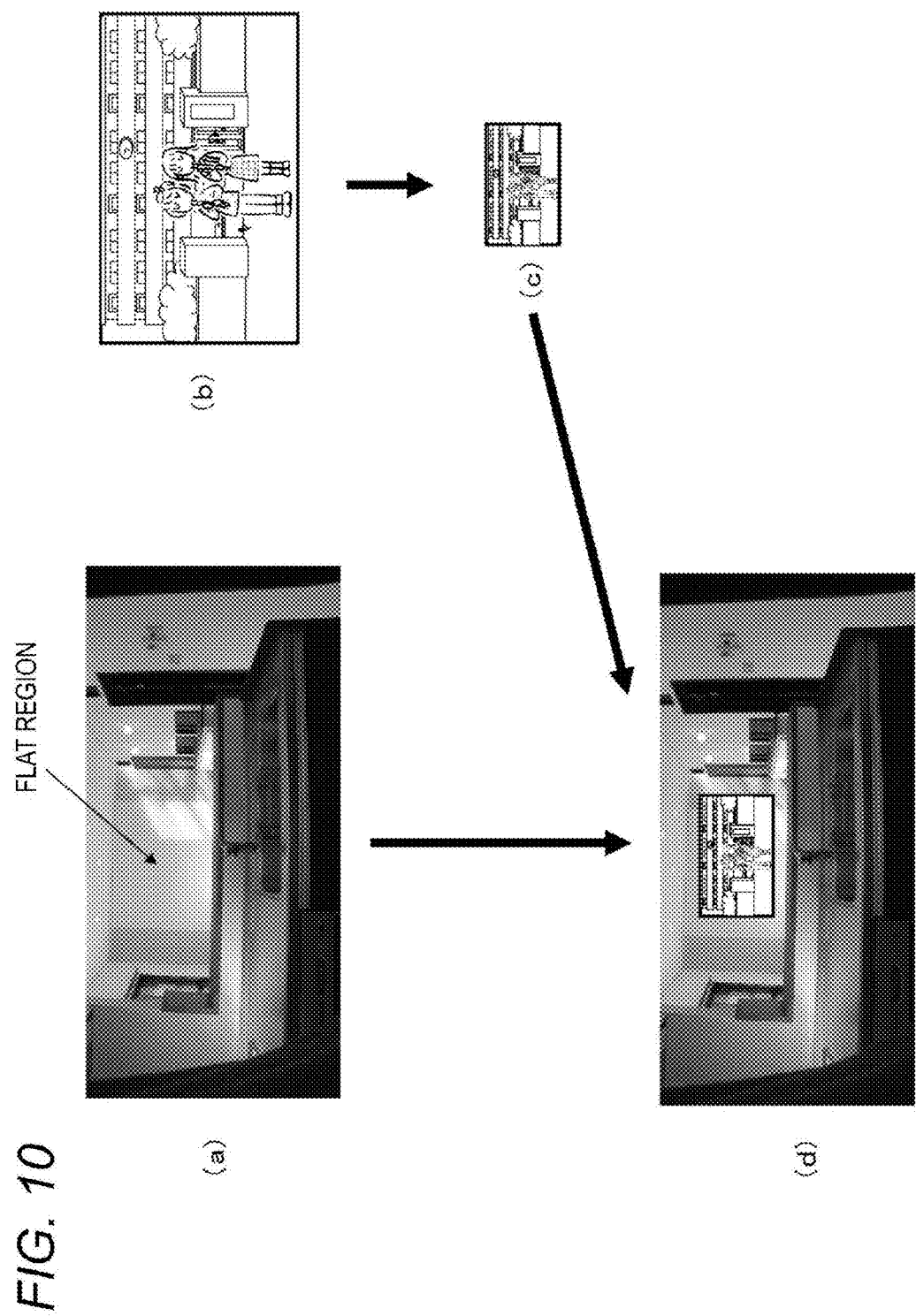
FIGS. 10(a) to 10(d) are diagrams for explaining a case where a display image is displayed in an image superimposition region such as a flat region detected from an outside image.

In this case, the flat region in the wall portion shown on the upper middle side in FIG. 10(*a*) is detected as an image superimposition region. The display size and the display position of the display image shown in FIG. 10(*b*) are adjusted as shown in FIG. 10(*c*) so that the display image is displayed in this flat region. The display image is then superimposed and displayed on the outside image as shown in FIG. 10(*d*).

Figure 11:
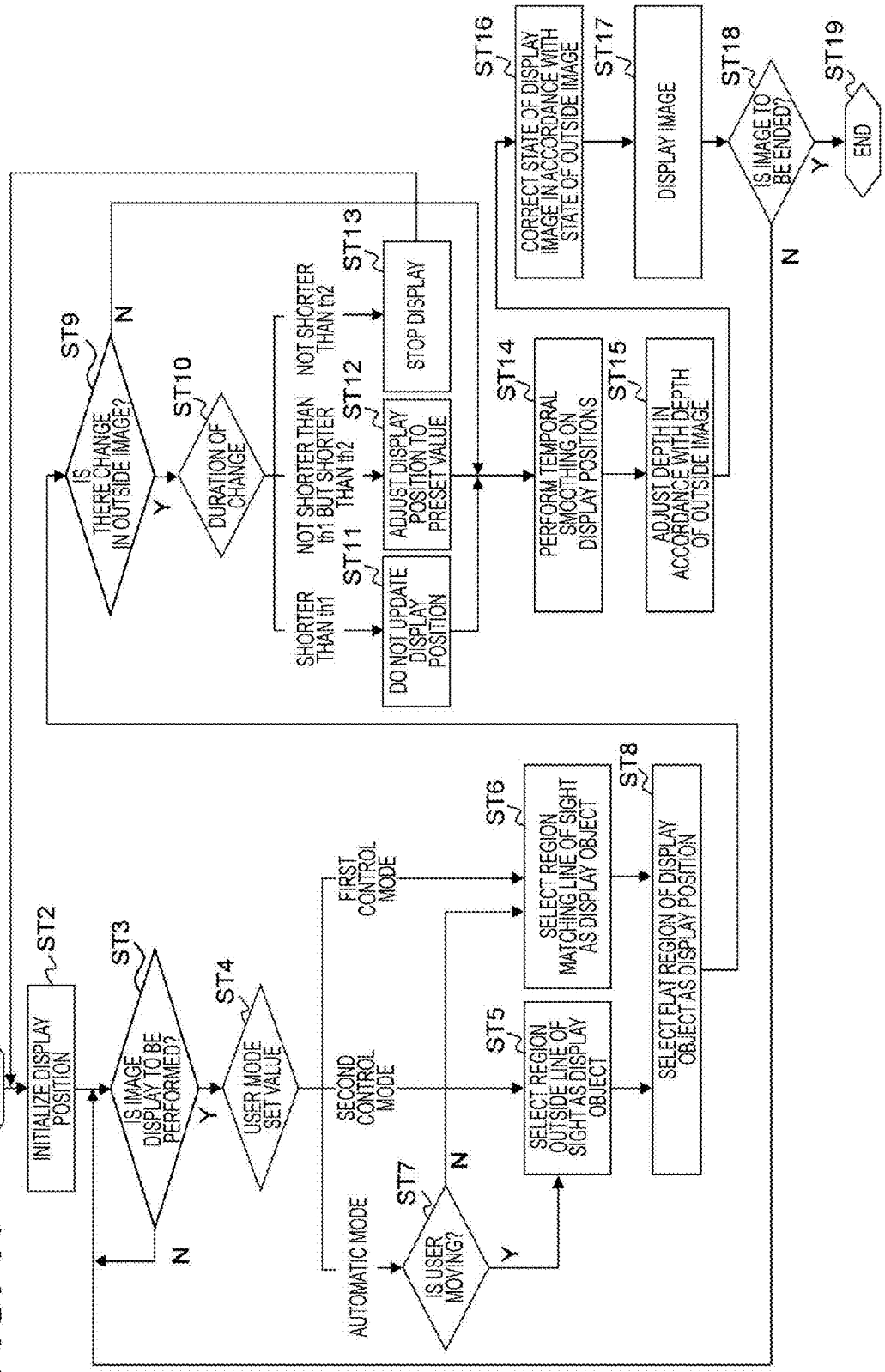
FIG. 11 is a flowchart showing an example of procedures for performing display control at the display control unit.

The flowchart in FIG. 11 shows an example of procedures for performing display control at the display control unit 124 of the HMD 100 shown in FIG. 1. In step ST1, the display control unit 124 starts operation when a power-on operation is performed by a user, for example. In step ST2, the display control unit 124 initializes the display position of the display image to a preset value, for example. A display size is uniquely determined for the display position initialized in this manner.

In step ST3, the display control unit 124 determines whether image display is to be performed. If an image display setting operation is performed by the user, for example, the display control unit 124 determines that image display is to be performed. When image display is to be performed, the display control unit 124 in step ST4 determines the value of the mode set by the user.

When the value of the set mode indicates "second control mode", the display control unit 124 in step ST5 selects a region outside the line of sight in the outside image as the object to be displayed. When the value of the set mode indicates "first control mode", the display control unit 124 in step ST6 selects the region that matches the line of sight in the outside image as the object to be displayed.

When the value of the set mode indicates "automatic mode", the display control unit 124 in step ST7 determines whether the user is currently moving. If the user is currently moving, the display control unit 124 in step ST5 selects a region outside the line of sight in the outside image as the object to be displayed. If the user is currently not moving, the display control unit 124 in step ST6 selects a region that matches the line of sight in the outside image as the object to be displayed.

After carrying out the procedure of step ST5 or ST6, the display control unit 124 moves on to the procedure of step ST8. In step ST8, the display control unit 124 selects a flat region in the object to be displayed as the display position. When there is more than one flat region in the object to be displayed, the region with the largest area is selected as the display position. In this manner, the display size and the display position of the display image are determined.

In step ST9, the display control unit 124 determines whether there is a change in the outside image. If there is a change in the outside image, the duration of the change is determined in step ST10. If the duration is shorter than "th1", the display control unit 124 in step ST11 does not change the display position. If the duration is equal to or longer than "th1" but is shorter than "th2", the display control unit 124 in step ST12 changes the display position to the preset position. If the duration is equal to or longer than "th2", the display control unit 124 in step ST13 stops the display of the display image.

After carrying out the procedure of step ST13, the display control unit 124 returns to the procedure of step ST2, and repeats the same procedures as those described above. After carrying out the procedure of step ST11 or ST12, the display control unit 124 moves on to the procedure of step ST14. In step ST14, the display control unit 124 performs temporal smoothing on the display positions (display sizes). In this manner, even a rapid change of the display position (display size) can be changed to a smooth change.

In step ST15, the display control unit 124 adjusts the depth position of the display image (stereoscopic image) in accordance with the depth position of the outside image. As described above, when the display image is to be displayed in a flat region in the outside image, the depth position of the display image is adjusted by generating the left-eye and right-eye image data for display in accordance with the display size and the display position provided from the depth/structure estimating unit 123. In a case where the display image is to be displayed in the preset position, the display positions of the left-eye and right-eye display images are moved and adjusted in the horizontal direction in accordance with the depth position of the outside image in the preset position.

In step ST16, the display control unit 124 corrects the left-eye and right-eye image data for display in accordance with the state of the display region in the outside image. In step ST17, the display control unit 124 performs image display. Specifically, the left-eye and right-eye image data for display is supplied from the to-be-displayed image generating unit 125 to the display drivers 111L and 111R, respectively, and the left-eye image and the right-eye image are displayed on the displays 112L and 112R.

In step ST18, the display control unit 124 determines whether the image has come to an end. If an image display canceling operation is performed by the user, for example, the display control unit 124 determines that the image has come to an end. If the image has come to an end, the display control unit 124 in step ST19 ends the display control process. If the image has not come to an end, the display control unit 124 returns to step ST3, and repeats the same procedures as those described above.

For ease of explanation, the above described example of the procedures shown in the flowchart in FIG. 11 is based on the assumption that a flat region always exists in the object to be displayed. However, there might be a case where any flat region does not exist in the region selected as the object to be displayed in step ST5 or ST6. In such a case, the display control unit 124 controls the display position of the display image or controls switching on and off of the display in accordance with the duration of flat region non-detection time as described above, for example.

Not all the components of the HMD 100 shown in FIG. 1 need to be included in the HMD main frame. Instead, some of the components may be placed in a control box that is connected to the HMD in a wired or wireless manner, or some of the components may be placed in a cloud connected to the HMD via a network.

Figure 12:
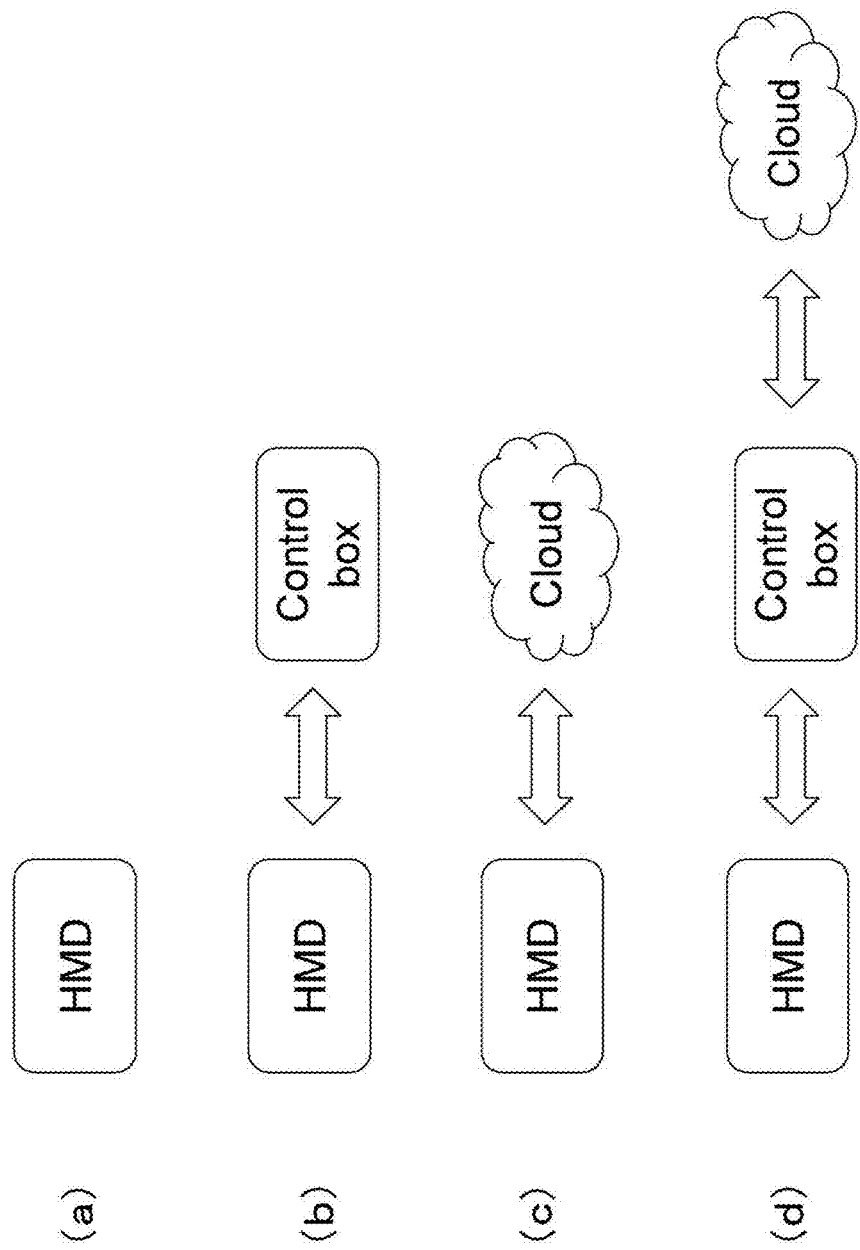
FIGS. 12(a) to 12(d) are diagrams schematically showing example layouts of components of an optically-transmissive head mount display.

FIGS. 12(*a*) to 12(*d*) schematically show example layouts of the respective components of the HMD 100. FIG. 12(*a*) shows a case where all the components of the HMD 100 are placed in the HMD main frame. FIG. 12(*b*) shows a case where some of the components of the HMD 100 are placed in a control box. In this case, the eye position estimating unit 121, the line-of-sight estimating unit 122, the depth/structure estimating unit 123, the display control unit 124, and the to-be-displayed image generating unit 125 are placed in the control box, and the rest of the components are placed in the HMD main frame, for example.

FIG. 12(*c*) shows a case where some of the components of the HMD 100 are placed in a cloud. In this case, the eye position estimating unit 121, the line-of-sight estimating unit 122, the depth/structure estimating unit 123, the display control unit 124, and the to-be-displayed image generating unit 125 are placed in the cloud, and the rest of the components are placed in the HMD main frame, for example.

FIG. 12(*d*) shows a case where some of the components of the HMD 100 are placed in a control box and a cloud. In this case, the eye position estimating unit 121, the line-of-sight estimating unit 122, and the to-be-displayed image generating unit 125 are placed in the control box, the depth/structure estimating unit 123 and the display control unit 124 are placed in the cloud, and the rest of the components are placed in the HMD main frame, for example.

As described above, in the HMD 100 shown in FIG. 1, display control is performed so that a display image is displayed in an image superimposition region such as a flat region detected from an outside image, and accordingly, it becomes easier for the observer (user) to visually recognize the display image superimposed and displayed on the outside image.

Also, in the HMD 100 shown in FIG. 1, display of the display image to be superimposed and displayed on the outside image can be controlled in "first control mode" or "second control mode". Specifically, the display image can be displayed in the region on which the line of sight of the observer (user) concentrates in the outside image, or the display image can be displayed in a region outside the region on which the line of sight of the observer concentrates in the outside image, so that the display of the display image does not obstruct any activity.

Also, in the HMD 100 shown in FIG. 1, "automatic mode" is set, so that control is performed in "first control mode" when the observer (user) is not moving, and control is performed in "second control mode" when the observer (user) is moving. Therefore, when the observer is not moving, control is automatically switched to "first control mode", and the display image is displayed in the region on which the line of sight of the observer concentrates in the outside image. That is, the observer does not need to switch modes to concentrate on the display image in this case, and accordingly, higher user friendliness is achieved.

Also, in the HMD 100 shown in FIG. 1, the display state of a display image is changed in accordance with the state of the region on which this display image is to be superimposed in the outside image. Accordingly, components of the outside image can be removed from the display image to be observed by the observer (user), and the visibility of the display image can be increased, regardless of the state of the outside image.

Also, in the HMD 100 shown in FIG. 1, the disparities of the left-eye image and the right-eye image are controlled based on the depth position of the region in the outside image on which the display image (stereoscopic image) is to be superimposed, so that the depth position of the display image (stereoscopic image) becomes closer to the front side than the depth position of the region. Accordingly, the display image (stereoscopic image) can be superimposed and displayed on the outside image without causing any inconsistency in depth.

<2. Modifications>

Figure 13:
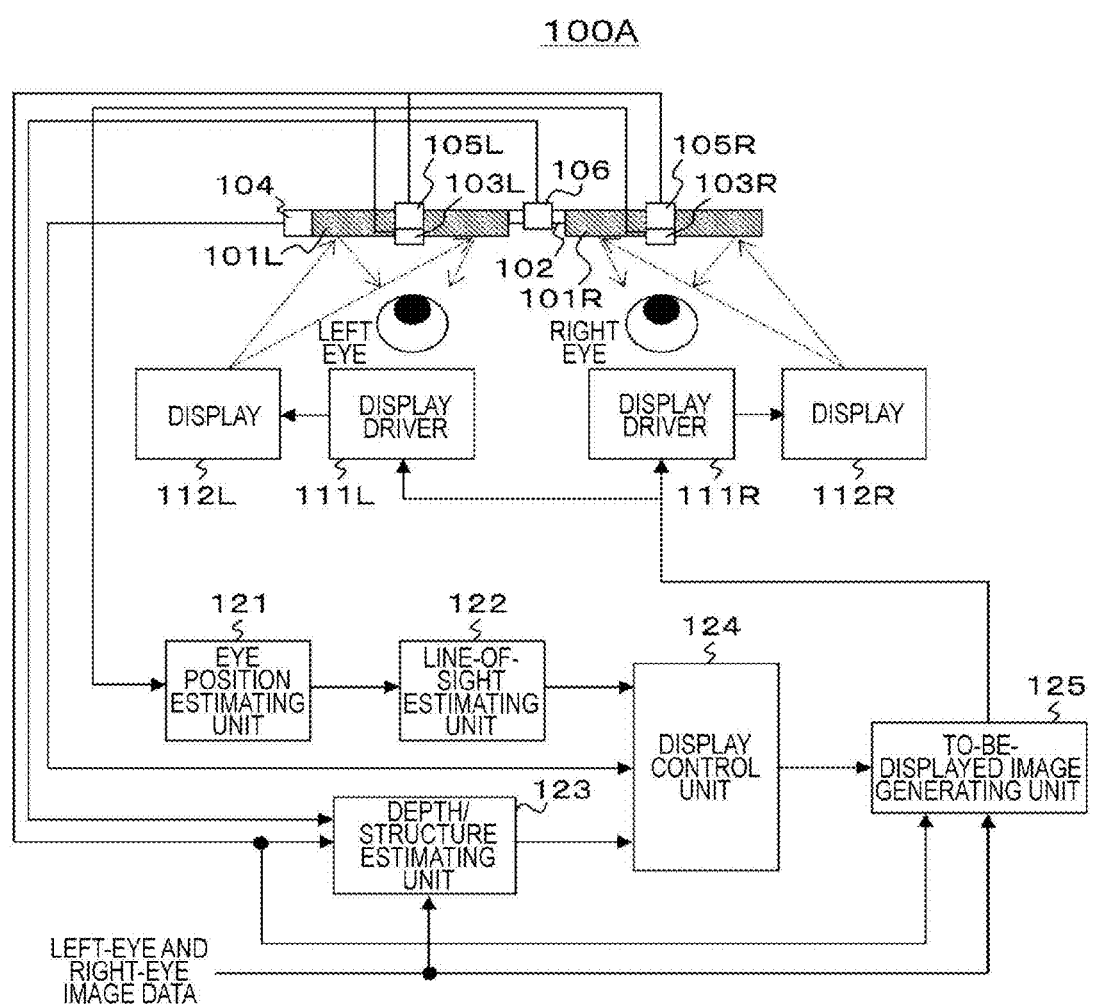
FIG. 13 is a diagram showing another example structure of an optically-transmissive head mount display.

In the above described embodiment, the depth/structure estimating unit 123 calculates a disparity map indicating the depth position of each pixel in an outside image based on captured image data from the cameras 105L and 105R. However, as shown in FIG. 13, it is possible to form a HMD 100A in which a distance measuring sensor 106 is provided at the connecting member 102, and the depth/structure estimating unit 123 calculates a disparity map indicating the depth positions of the respective pixels in the outside image based on a sensor output of the distance measuring sensor 106.

Figure 14:
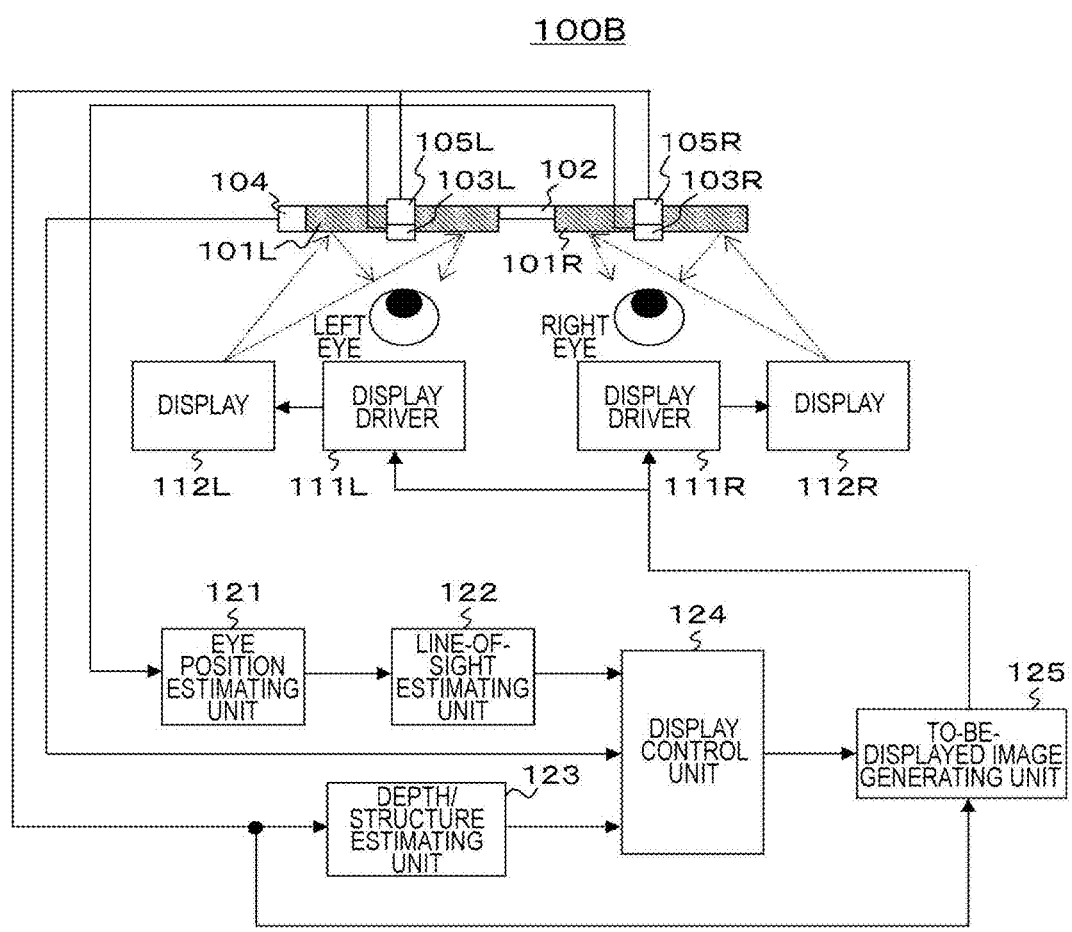
FIG. 14 is a diagram showing yet another example structure of an optically-transmissive head mount display.

Also, in the above described embodiment, the left-eye and right-eye image data for display differs from the captured left-eye and right-eye image data of the outside image obtained by the cameras 105L and 105R. However, as shown in FIG. 14, it is possible to form a HMD 100B that uses captured left-eye and right-eye image data as the left-eye and right-eye image data for display.

Figure 15:
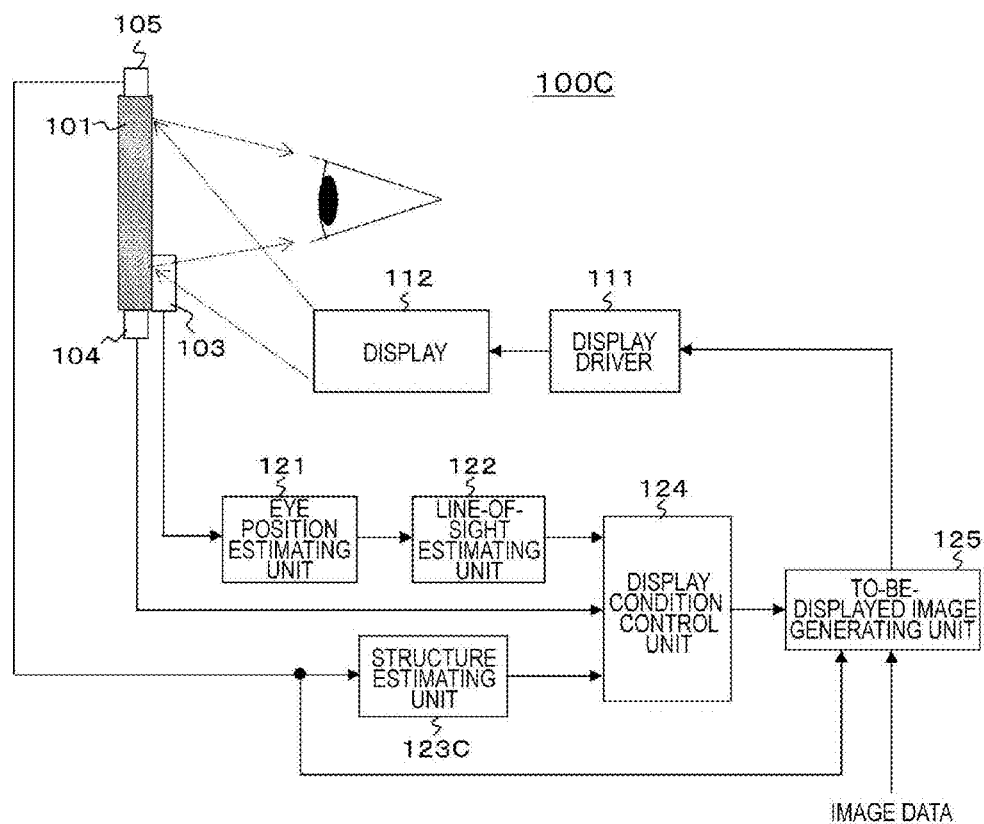
FIG. 15 is a diagram showing still another example structure of an optically-transmissive head mount display.

Although an example of a binocular HMD has been described in the above embodiment, the present technique can also be applied to a monocular HMD. FIG. 15 shows an example structure of a monocular HMD 100C. In FIG. 15, the same components as those shown in FIG. 1 are denoted by the same reference numerals as those used in FIG. 1, and explanation of them is not repeated herein.

Being a monocular HMD, this HMD 100C has one glass lens unit 101, while the HMD 100 shown in FIG. 1 has the two glass lens units 101L and 101R. An infrared sensor 103 that functions in the same manner as the infrared sensors 103L and 103R in the HMD 100 shown in FIG. 1 is provided in the center position of the glass lens unit 101 in the horizontal direction (the center position of the optical system in the horizontal direction). A sensor output of this infrared sensor 103 is sent to an eye position estimating unit 114.

A gyro sensor 104 is also attached to the glass lens unit 101. A sensor output of the gyro sensor 104 is used for determining whether there is a change in the image of the outside, and whether the observer (user) is moving. A sensor output of this gyro sensor 104 is sent to a display control unit 124.

A camera 105 is also provided in the center position of the glass lens unit 101 in the horizontal direction (the center position of the optical system in the horizontal direction). The camera 105 functions in the same manner as the cameras 105L and 105R in the HMD 100 shown in FIG. 1, captures the outside image being observed with the left eye or the right eye of the observer through the glass lens unit 101, and outputs captured image data. This captured image data is sent to a structure estimating unit 123C.

The eye position estimating unit 121 estimates a position of an eye (the left eye or the right eye) of the observer based on the sensor output from the infrared sensor 103. The line-of-sight estimating unit 122 estimates a line of sight of the observer based on the result of the eye position estimation performed by the eye position estimating unit 121. The result of this line-of-sight estimation is supplied to the display control unit 124.

The structure estimating unit 123C detects a flat region as an image superimposition region from the outside image based on the captured image data from the camera 105. The structure estimating unit 123 then determines a display size and a display position of the display image based on the detected flat region. In this case, temporal smoothing is performed on display sizes and display positions determined for the respective frames, and the display size and the display position of the display image are stabilized. The information about the display size and the display position for display control that are determined by the structure estimating unit 123C in this manner is supplied to the display control unit 124.

The display control unit 124 controls display of the display image based on the result of the line-of-sight estimation performed by the line-of-sight estimating unit 122, the sensor output of the gyro sensor 104, and the information about the display size and the display position determined by the structure estimating unit 123C. In this case, the display control unit 124 basically performs control so that the display image is displayed in the display size and the display position determined by the structure estimating unit 123C at the time of display of the display image.

When a flat region as an image superimposition region is not detected by the structure estimating unit 123C, the display control unit 124 changes manners of display. When a change in the outside image is detected based on the gyro sensor 104, the display control unit 124 also changes manners of display.

The display control unit 124 also changes manners of display based on the line-of-sight estimation result from the line-of-sight estimating unit 122. This control is performed in accordance with a mode that is set by the user (observer). The user can set "automatic control mode", "first control mode", or "second control mode", for example.

Where "first control mode" is set, control is performed so that the display image is displayed in the region on which the line of sight concentrates. Where "second control mode" is set, control is performed so that the display image is displayed in a region outside the region on which the line of sight concentrates. Where "automatic mode" is set, control is performed so that the display image is displayed outside the region on which the line of sight concentrates when the observer is moving, and control is performed so that the display image is displayed in the region on which the line of sight concentrates when the observer is not moving.

Image data is supplied to the to-be-displayed image generating unit 125. The captured image data from the camera 105 is also supplied to this to-be-displayed image generating unit 125. Under the control of the display control unit 124, the to-be-displayed image generating unit 125 generates the image data for displaying the display image so that the display image is displayed in the determined display size and the determined display position.

In this case, a reduction process and a moving process are performed on image data supplied from outside, to generate the image data for display. When the display of the display image is stopped, the generation of the image data is stopped. The to-be-displayed image generating unit 125 also corrects the image data for display so that the display state of the display image is changed in accordance with the state of the region on which the display image is to be displayed in the outside image (see the mathematical formula (2)).

Although the other aspects of the HMD 100C shown in FIG. 15 are not described herein, the HMD 100C has the same design as the HMD 100 shown in FIG. 1, operates in the same manner as the HMD 100, and can achieve the same effects as those of the HMD 100.

In the above described embodiment, eye positions and a line of sight are estimated by using sensor outputs of the infrared sensors. However, a structure for estimating a line of sight of an observer (a user) is not limited to that structure. For example, it is also possible to use an EOG (Electro-Oculogram) method, a face recognition technology, or the like.

In the above described embodiment, the present technique is applied to an optically-transmissive head mount display. However, the present technique is not limited to applications to optically-transmissive head mount displays, but can also be applied to other transmissive display apparatuses. In this case, displaying a virtual image is not necessary.

The present technique may also be embodied in the structures described below.

(1) An image display apparatus including:
an optical system that superimposes a display image displayed on a display device onto an outside image, and leads the display image to an eye of an observer; and
a display control unit that controls a display size and a display position of the display image on the display device so that the display image is displayed in an image superimposition region detected from the outside image.

(2) The image display apparatus of (1), wherein the image superimposition region is detected based on captured image data obtained by forming the outside image.

(3) The image display apparatus of (1) or (2), wherein the display control unit controls the display size and the display position of the display image by processing image data for displaying the display image on the display device based on information about the image superimposition region.

(4) The image display apparatus of any of (1) through (3), wherein the display control unit changes a display state of the display image in accordance with a state of the image superimposition region in the outside image.

(5) The image display apparatus of (4), wherein the display control unit corrects the image data for displaying the display image in accordance with the state of the image superimposition region so that elements of the outside image are removed from the display image to be observed by the observer.

(6) The image display apparatus of any of (1) through (5), wherein, when the image superimposition region is not detected from the outside image, the display control unit changes manners of display of the display image.

(7) The image display apparatus of any of (1) through (6), wherein the display control unit obtains the display size and the display position for the control by performing temporal smoothing on display sizes and display positions on the display device, the display sizes and the display positions being determined by the image superimposition region that is cyclically detected.

(8) The image display apparatus of any of (1) through (7), wherein, when a change in the outside image is detected, the display control unit changes manners of display of the display image.

(9) The image display apparatus of any of (1) through (8), wherein
the optical system includes a first optical system that superimposes a left-eye image displayed on a first display device onto an outside image and leads the left-eye image to the left eye of the observer, and a second optical system that superimposes a right-eye image displayed on a second display device onto the outside image and leads the right-eye image to the right eye of the observer, and
the display control unit controls disparities of the left-eye image and the right-eye image so that a depth position of a stereoscopic image to be perceived by the observer through the left-eye image and the right-eye image is located closer to the front side than a depth position of a region in which the stereoscopic image is displayed in a superimposed manner in the outside image.

(10) An image display method including the steps of:
superimposing a display image displayed on a display device onto an outside image, and leading the display image to an eye of an observer, the superimposing and leading the display image being performed by an optical system; and
controlling a display size and a display position of the display image on the display device so that the display image is displayed in an image superimposition region detected from the outside image.

(11) An image display apparatus including:
an optical system that superimposes a display image displayed on a display device onto an outside image, and leads the display image to an observer; and
a display control unit that has a first control mode for performing control so that the display image is displayed in a region on which a line of sight of the observer concentrates in the outside image, and a second control mode for performing control so that the display image is displayed in a region outside the region on which the line of sight of the observer concentrates in the outside image.

(12) The image display apparatus of (11), wherein the display control unit performs control in the first control mode when the observer is not moving, and performs control in the second control mode when the observer is moving.

(13) The image display apparatus of (11) or (12), wherein the display control unit changes a display state of the image in accordance with a state of a region on which the display image is to be superimposed in the outside image.

(14) The image display apparatus of any of (11) through (13), wherein
the optical system includes a first optical system that superimposes a left-eye image displayed on a first display device onto an outside image and leads the left-eye image to the left eye of the observer, and a second optical system that superimposes a right-eye image displayed on a second display device onto the outside image and leads the right-eye image to the right eye of the observer, and
the display control unit controls disparities of the left-eye image and the right-eye image so that a depth position of a stereoscopic image to be perceived by the observer through the left-eye image and the right-eye image is located closer to the front side than a depth position of a region in which the stereoscopic image is displayed in a superimposed manner in the outside image.

(15) An image display method including the steps of:
superimposing a display image displayed on a display device onto an outside image, and leading the display image to an eye of an observer, the superimposing and leading the display image being performed by an optical system; and
selectively performing control to display the display image in a region on which a line of sight of the observer concentrates in the outside image, and control to display the display image in a region outside the region on which the line of sight of the observer concentrates in the outside image.

(16) An image display apparatus including:
an optical system that superimposes a display image displayed on a display device onto an outside image, and leads the display image to an eye of an observer; and
a display control unit that changes a display state of the display image in accordance with a state of a region on which the display image is superimposed in the outside image.

(17) The image display apparatus of (16), wherein the display control unit acquires the state of the region in the outside image based on captured image data obtained by forming the outside image.

(18) An image display method including the steps of:
superimposing a display image displayed on a display device onto an outside image, and leading the display image to an eye of an observer, the superimposing and leading the display image being performed by an optical system; and changing a display state of the display image in accordance with a state of a region on which the display image is superimposed in the outside image.

(19) An image display apparatus including:
a first optical system that superimposes a left-eye image displayed on a first display device onto an outside image, and leads the left-eye image to the left eye of an observer;
a second optical system that superimposes a right-eye image displayed on a second display device onto the outside image, and leads the right-eye image to the right eye of the observer; and
a display control unit that controls disparities of the left-eye image and the right-eye image so that a depth position of a stereoscopic image to be perceived by the observer through the left-eye image and the right-eye image is located closer to the front side than a depth position of a region in which the stereoscopic image is displayed in a superimposed manner in the outside image.

(20) An image display method including the steps of:
superimposing a left-eye image displayed on a first display device onto an outside image, and leading the left-eye image to the left eye of an observer, the superimposing and leading the left-eye image being performed by a first optical system;
superimposing a right-eye image displayed on a second display device onto the outside image, and leading the right-eye image to the right eye of the observer, the superimposing and leading the right-eye image being performed by a second optical system; and controlling disparities of the left-eye image and the right-eye image so that a depth position of a stereoscopic image to be perceived by the observer through the left-eye image and the right-eye image is located closer to the front side than a depth position of a region in which the stereoscopic image is displayed in a superimposed manner in the outside image.

REFERENCE SIGNS LIST

100, 100A to 100C Head mount display
101, 101L, 101R Glass lens unit
102 Connecting member
103, 103L, 103R Infrared sensor
104 Gyro sensor
105, 105L, 104R Camera
106 Distance measuring sensor
111, 111L, 111R Display driver
112, 112L, 112R Display
121 Eye position estimating unit
122 Line-of-sight estimating unit
123 Depth/structure estimating unit
123C Structure estimating unit
124 Display control unit
125 To-be-displayed image generating unit

The invention claimed is:

1. An image display apparatus, comprising:
an optical system configured to superimpose a display image, displayed on a display device, onto a real-world image; and
a display control unit configured to temporal smooth, by a plurality or coordinate filters, and to control a size and a position of the display image displayed on the display device so that the display image is displayed in an image superimposition region in the real-world image.

2. The image display apparatus according to claim 1, wherein the image superimposition region is detected based on captured image data obtained by the real-world image.

3. The image display apparatus according to claim 1, wherein the display control unit is configured to control the size and the position of the display image based on image data to display the display image on the display device based on information about the image superimposition region.

4. The image display apparatus according to claim 1, wherein the display control unit is further configured to change a display state of the display image based on a state of the image superimposition region in the real-world image.

5. The image display apparatus according to claim 4, wherein the display control unit is further configured to correct image data to display the display image based on the state of the image superimposition region so that an element of the real-world image is removed from the display image to be observed by an observer.

6. The image display apparatus according to claim 1, wherein, based on a determination that the image superimposition region is undetected from the real-world image, the display control unit changes manners of display of the display image.

7. The image display apparatus according to claim 1, wherein the display control unit is configured to control the size and the position based on the temporal smoothing on sizes and positions on the display device, the sizes and positions are determined by the image superimposition region that is cyclically detected.

8. The image display apparatus according to claim 1, wherein, in an event a change in the real-world image is detected, the display control unit changes manners of display of the display image.

9. The image display apparatus according to claim 1, wherein
the optical system includes a first optical system configured to superimpose a left-eye image displayed on a first display device onto the real-world image, and a second optical system configured to superimpose a right-eye image displayed on a second display device onto the real-world image, and
wherein the display control unit is further configured to control disparities of the left-eye image and the right-eye image so that a depth position of a stereoscopic image to be perceived by an observer through the left-eye image and the right-eye image is located closer to a front side than a depth position of a region in which the stereoscopic image is displayed in a superimposed manner in the real world image.

10. The image display apparatus according to claim 1, wherein the plurality of coordinate filters include average filter, majority filter or infinite impulse response (IIR) filter.

11. An image display method, comprising:
superimposing a display image displayed on a display device, onto a real-world image; and
temporal smoothing, by a plurality of coordinate filters, and controlling a size and a position of the display image displayed on the display device so that the display image is displayed in an image superimposition region in the real-world image.

12. An image display apparatus, comprising:
an optical system configured to superimpose a display image, displayed on a display device, onto a real-world image; and
a display control unit that includes a first control mode in which the display image is displayed in a region on which a line of sight of an observer concentrates in the real-world image, and a second control mode in which the display image is displayed in a region outside the region on which the line of sight of the observer concentrates in the real-world image, wherein the display control unit is configured to temporal smooth, by a plurality of coordinate filters, and to control a size and a position of the display image display on the display device.

13. The image display apparatus according to claim 12, wherein in the first control mode the observer is stable, and in the second control mode the observer is moving.

14. The image display apparatus according to claim 12, wherein the display control unit is further configured to change a display state of the image based on a state of a region on which the display image is to be superimposed in the real-world image.

15. The image display apparatus according to claim 12, wherein the optical system includes a first optical system configured to superimpose a left-eye image displayed on a first display device onto the real-world image, and a second optical system configured to superimpose a right-eye image displayed on a second display device onto the real-world image, and wherein the display control unit is further configured to control disparities of the left-eye image and the right-eye image so that a depth position of a stereoscopic image to be perceived by the observer through the left-eye image and the right-eye image is located closer to a front side than a depth position of a region in which the stereoscopic image is displayed in a superimposed manner in the real-world image.

16. An image display method, comprising:
superimposing a display image, displayed on a display device, onto a real-world image;
controlling display the display image in a region on which a line of sight of an observer concentrates in the real-world image, and display of the display image in a region outside the region on which the line of sight of the observer concentrates in the real-world image; and
temporal smoothing, by a plurality of coordinate filters, and controlling a size and a position of the display image displayed on the display device.

17. An image display apparatus, comprising:
an optical system configured to superimpose a display image, displayed on a display device onto a real-world image; and
a display control unit configured to change a display state of the display image based on a state of a region on which the display image is superimposed in the real-world image,
wherein the display control unit is further configured to temporal smooth, by a plurality of coordinate filters, and to control a size and a position of the display image displayed on the display device.

18. The image display apparatus according to claim 17, wherein the display control unit is further configured to acquire the state of the region in the real-world image based on captured image data obtained by the real-world image.

19. An image display method, comprising:
superimposing a display image, displayed on a display device, onto a real-world image;
changing a display state of the display image based on a state of a region on which the display image is superimposed in the real-world image; and
temporal smoothing, by a plurality of coordinate filters, and controlling a size and a position of the display image displayed on the display device.

20. An image display apparatus, comprising:
a first optical system configured to superimpose a left-eye image, displayed on a first display device, onto a real-world image;
a second optical system configured to superimpose a right-eye image, displayed on a second display device, onto the real-world image; and
a display control unit configured to control disparities of the left-eye image and the right-eye image so that a depth position of a stereoscopic image to be perceived by an observer through the left-eye image and the right-eye image is located closer to a front side than a depth position of a region in which the stereoscopic image is displayed in a superimposed manner in the real-world image,
wherein the display control unit is further configured to temporal smooth, by a plurality of coordinate filters, and to control a size and a position of the left-eye image displayed on the first display device and the right-eye image displayed on the second display device.

21. An image display method, comprising:
superimposing a left-eye image, displayed on a first display device, onto a real-world image;
superimposing a right-eye image, displayed on a second display device, onto the real-world image;
controlling disparities of the left-eye image and the right-eye image so that a depth position of a stereoscopic image to be perceived by an observer through the left-eye image and the right-eye image is located closer to a front side than a depth position of a region in which the stereoscopic image is displayed in a superimposed manner in the real-world image; and
temporal smoothing, by a plurality of ordinate filters, and controlling a size and a position of the left-eye image displayed on the first device and the right-eye image displayed on the second display device.

* * * * *